United States Patent
Yoshii

(10) Patent No.: US 10,003,720 B2
(45) Date of Patent: Jun. 19, 2018

(54) IMAGE PROCESSING APPARATUS AND METHOD, AND PROGRAM AND RECORDING MEDIUM

(71) Applicant: MITSUBISHI ELECTRIC CORPORATION, Tokyo (JP)

(72) Inventor: Hideki Yoshii, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days. days.

(21) Appl. No.: 15/517,117

(22) PCT Filed: May 29, 2015

(86) PCT No.: PCT/JP2015/065497
§ 371 (c)(1),
(2) Date: Apr. 5, 2017

(87) PCT Pub. No.: WO2016/088393
PCT Pub. Date: Jun. 9, 2016

(65) Prior Publication Data
US 2017/0318190 A1 Nov. 2, 2017

(30) Foreign Application Priority Data
Dec. 5, 2014 (JP) .................... 2014-246393

(51) Int. Cl.
*G06K 9/00* (2006.01)
*H04N 1/60* (2006.01)
(Continued)

(52) U.S. Cl.
CPC ............ *H04N 1/6005* (2013.01); *G06T 5/40* (2013.01); *H04N 1/6027* (2013.01); *H04N 9/68* (2013.01)

(58) Field of Classification Search
CPC ...... H04N 1/6005; H04N 9/68; H04N 1/6027; G06T 5/40; G06T 5/001
See application file for complete search history.

(56) References Cited

U.S. PATENT DOCUMENTS 6,151,136 A   11/2000  Takemoto
6,192,149 B1  2/2001   Eschbach et al.
(Continued)

FOREIGN PATENT DOCUMENTS

JP   4-248681 A   9/1992
JP   10-23279 A   1/1998
(Continued)

*Primary Examiner* — Samir Ahmed
(74) *Attorney, Agent, or Firm* — Birch, Stewart, Kolasch & Birch, LLP

(57) ABSTRACT

Based on a histogram of saturation of an input video, a saturation conversion function is determined, and, referring to the determined saturation conversion function, the saturation of each pixel of the input video is converted. Alternatively, a saturation conversion coefficient determination function is generated from the histogram, a saturation conversion coefficient is determined from the saturation conversion coefficient determination function and the saturation, and color differences are multiplied by the determined saturation conversion coefficient. Regardless of what saturation distribution the input video has, the saturation can be properly enhanced, and at the same time a high gradation expression can be obtained.

20 Claims, 10 Drawing Sheets

(51) Int. Cl.
*G06T 5/40* (2006.01)
*H04N 9/68* (2006.01)

(56) References Cited

U.S. PATENT DOCUMENTS

| | | | | |
|---|---|---|---|---|
| 7,616,214 | B2 * | 11/2009 | Huh | G09G 5/00 345/207 |
| 7,734,114 | B1 * | 6/2010 | Srinivasan | H04N 9/68 348/256 |
| 7,856,141 | B2 * | 12/2010 | Li | H04N 9/68 382/167 |
| 2001/0055420 | A1 * | 12/2001 | Nagatani | G06T 5/007 382/167 |
| 2003/0002736 | A1 * | 1/2003 | Maruoka | G06T 5/009 382/168 |
| 2004/0013298 | A1 | 1/2004 | Choe et al. | |
| 2005/0025356 | A1 * | 2/2005 | Fukuda | G06K 9/40 382/167 |
| 2005/0219587 | A1 * | 10/2005 | Hayaishi | H04N 1/6027 358/1.9 |
| 2007/0076127 | A1 * | 4/2007 | Abe | H04N 9/68 348/645 |
| 2008/0018797 | A1 * | 1/2008 | Hsieh | H04N 1/6027 348/645 |
| 2009/0022395 | A1 * | 1/2009 | Cho | H04N 1/60 382/167 |
| 2009/0034838 | A1 * | 2/2009 | Umeda | H04N 1/6027 382/167 |
| 2011/0090362 | A1 | 4/2011 | Yanagita et al. | |
| 2014/0198261 | A1 * | 7/2014 | Yamaguchi | H04N 9/3114 348/744 |
| 2015/0249810 | A1 * | 9/2015 | Sasaki | H04N 9/643 345/589 |

FOREIGN PATENT DOCUMENTS

| JP | 10-294877 A | 11/1998 |
|---|---|---|
| JP | 2000-316095 A | 11/2000 |
| JP | 2004-7202 A | 1/2004 |
| JP | 2004-7301 A | 1/2004 |
| JP | 3749722 B2 | 3/2006 |
| JP | 2008-72252 A | 3/2008 |
| JP | 2009-124744 A | 6/2009 |
| JP | 2011-103639 A | 5/2011 |

* cited by examiner

FIG. 2
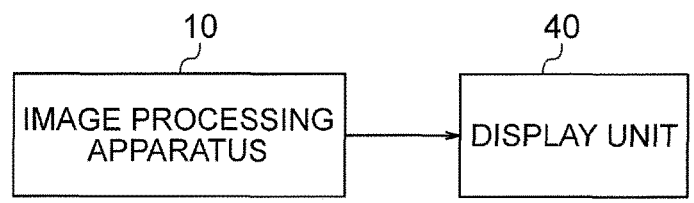
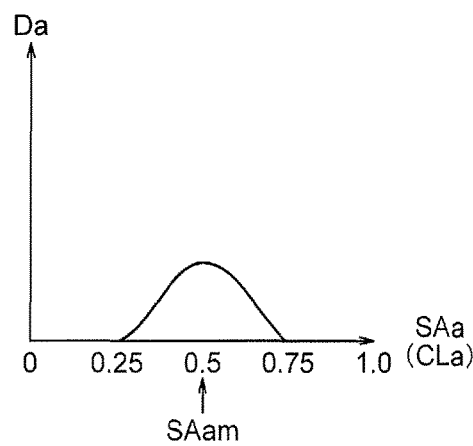
FIG. 3(a)
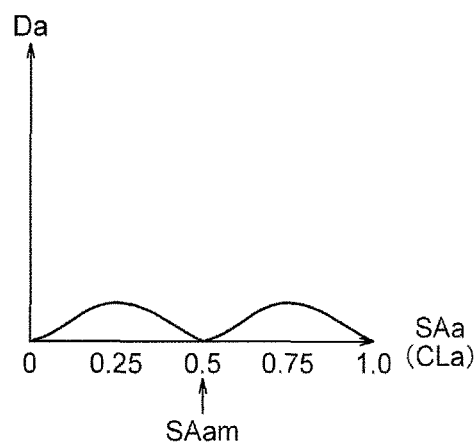
FIG. 3(b)
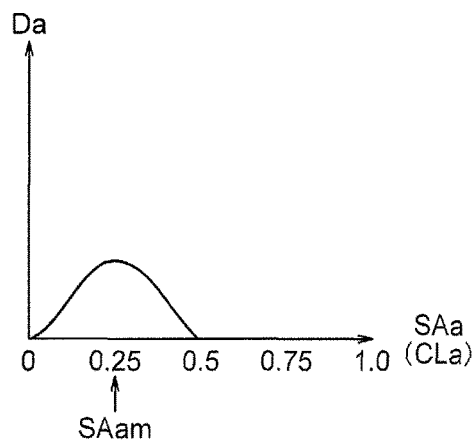
FIG. 3(c)
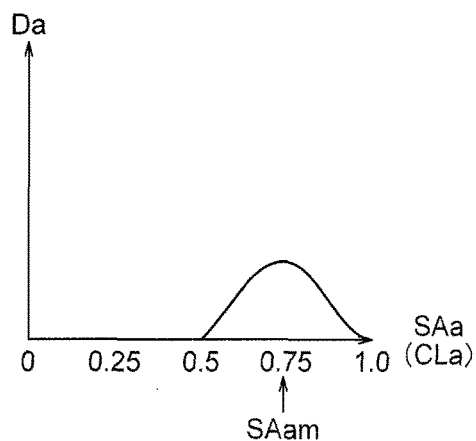
FIG. 3(d)

IMAGE PROCESSING APPARATUS AND METHOD, AND PROGRAM AND RECORDING MEDIUM

TECHNICAL FIELD

The present invention relates to an image processing apparatus and method. The present invention also relates to a program for causing a computer to execute the processes in the above-mentioned image processing apparatus or method, and a computer-readable recording medium in which the program is recorded.

BACKGROUND ART

In an apparatus for handling color images, display of images with vivid colors may be preferred. In order to meet with such preference, methods or apparatuses capable of natural enhancement of saturation of video including low-saturation areas have been proposed.

For instance, patent reference 1 discloses a method in which an average saturation value of input video is determined from the color signals of the input video, a saturation enhancement function is determined based on the average saturation value, and the saturation is enhanced.

Also, conventional video display apparatuses have a narrow color reproduction range, and the above-mentioned saturation enhancement has been made to achieve more vivid display of colors within the limited color gamut in which the reproduction is possible. With the expansion of the color reproduction range of the video display apparatuses brought about by advancement of technology in recent years, a greater importance is now attached to refinement in the gradation expression.

Furthermore, by a new standard concerning a video format for diffusion of ultra high definition television, a color gamut wider than the color gamut according to the conventional standard has been stipulated. As a result, a situation is envisaged in which the video signals according to the conventional standard and the video signals according to the new standard are both used.

PRIOR ART REFERENCES

Patent References

Patent Reference 1: Japanese Patent No. 3,749,722 (paragraph 0008)

SUMMARY OF THE INVENTION

Problem to be Solved by the Invention

Where the saturation is enhanced based on the average saturation value, there are instances in which video consisting of low saturation areas and high saturation areas, and video consisting only of intermediate saturation areas cannot be distinguished, and the enhancement of the saturation cannot be made properly.

Also, as mentioned above, a saturation enhancement process is often performed in video display apparatuses having a relatively narrow color reproduction range. As a result, there is little difference between a video display apparatus having a wide color reproduction range and a video display apparatus having a relatively narrow color reproduction range but performing the above-mentioned saturation enhancement process, in the case of input video consisting of low saturation areas and intermediate saturation areas. For instance, if the saturation is enhanced when the input video includes high saturation areas, color collapse may occur (colors which are originally different are rendered into the same color, and subtle difference in color is not perceived by the viewer). When a process is used by which saturation enhancement is not applied to high saturation areas, in an attempt to solve the above problem, higher color gradation expression cannot be achieved, and the merits of the video display apparatus having a wide color reproduction range cannot be fully utilized.

Means for Solving the Problem

An image processing apparatus according to a first aspect of the present invention comprises:

a color feature quantity calculation unit for calculating, from an input video signal, saturation, hue, and brightness for each pixel;

a saturation histogram generating unit for generating a saturation histogram from the saturation;

a saturation conversion function generating unit for generating a saturation conversion function from the saturation histogram generated by said saturation histogram generating unit;

a saturation conversion unit for converting the saturation of each pixel by means of the saturation conversion function generated by said saturation conversion function generating unit, and outputting the converted saturation; and a color component value calculation unit for calculating red, green and blue color component values, from the converted saturation output from said saturation conversion unit and the hue and the brightness calculated by said color feature quantity calculation unit.

An image processing apparatus according to a second aspect of the present invention comprises:

a saturation calculation unit for calculating, from an input video signal, saturation for each pixel;

a saturation histogram generating unit for generating a saturation histogram from the saturation;

a saturation conversion coefficient determination function generating unit for generating a saturation conversion coefficient determination function from the saturation histogram generated by said saturation histogram generating unit;

a saturation conversion coefficient determining unit for determining, from the saturation conversion coefficient determination function and the saturation of each pixel represented by the input video signal, a saturation conversion coefficient pertaining to said each pixel; and multipliers for multiplying color differences of said each pixel represented by the input video signal, by the saturation conversion coefficient pertaining to said each pixel determined by said saturation conversion coefficient determining unit.

Effects of the Invention

According to the image processing apparatus of the present invention, the saturation can be properly enhanced, and, also, a high color gradation expression can be achieved regardless of what saturation distribution the input video has.

BRIEF DESCRIPTION OF THE DRAWINGS

FIG. 2 is a block diagram showing an example of an image display apparatus comprising the image processing apparatus in FIG. 1 and a display unit.

FIGS. 3(a) to 3(d) are diagrams showing examples of saturation distributions.

MODE FOR CARRYING OUT THE INVENTION

First Embodiment

Figure 1:
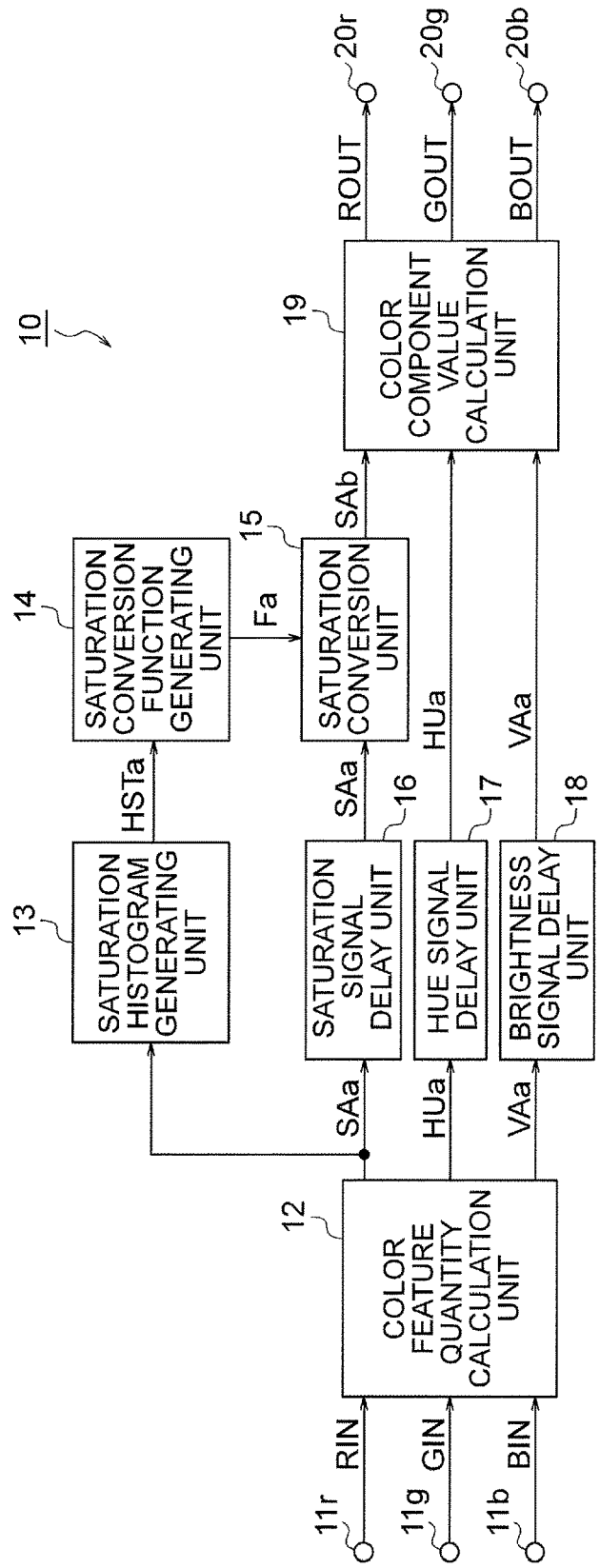
FIG. 1 is a block diagram showing a configuration of an image processing apparatus according to a first embodiment of the present invention.

FIG. 1 is a block diagram showing a configuration of an image processing apparatus 10 of a first embodiment of the present invention. The illustrated image processing apparatus 10 includes input terminals 11$r$, 11$g$, 11$b$, a color feature quantity calculation unit 12, a saturation histogram generating unit 13, a saturation conversion function generating unit 14, a saturation conversion unit 15, a saturation signal delay unit 16, a hue signal delay unit 17, a brightness signal delay unit 18, a color component value calculation unit 19, and output terminals 20$r$, 20$g$, 20$b$.

FIG. 2 shows the image processing apparatus 10 shown in FIG. 1 together with a display unit 40. The display unit 40 can be formed of what is generally called a display. The image processing apparatus 10 can be connected with the display unit 40 as shown in FIG. 2, and color signals ROUT, GOUT, BOUT output from the output terminals 20$r$, 20$g$, 20$b$ as will be described later are supplied to the display unit 40, which performs display of video based on the color signals ROUT, GOUT, BOUT.

The image processing apparatus 10 and the display unit 40 in combination form a video display apparatus.

Input to the input terminals 11$r$, 11$g$, 11$b$ is a video signal according to a standard which can be handled by the image display apparatus such as a television set or a computer. In the present embodiment, the video signal is assumed to be formed, for example, of red, green, and blue color signals RIN, GIN, BIN.

The color feature quantity calculation unit 12 calculates saturation SAa, hue HUa and brightness VAa from the color signals RIN, GIN, BIN input to the input terminals 11$r$, 11$g$, 11$b$.

The color feature quantity calculation unit 12 supplies a signal (saturation signal) representing the calculated saturation SAa to the saturation histogram generating unit 13, and to the saturation conversion unit 15 via the saturation signal delay unit 16.

The color feature quantity calculation unit 12 supplies a signal (hue signal) representing the calculated hue HUa and a signal (brightness signal) representing the calculated brightness VAa, via the hue signal delay unit 17 and the brightness signal delay unit 18, respectively, to the color component value calculation unit 19.

The saturation signal representing the saturation SAa is denoted by the same reference characters SAa as the saturation, the hue signal representing the hue HUa is denoted by the same reference characters HUa as the hue, the brightness signal representing the brightness VAa is denoted by the same reference characters VAa as the brightness. This is also the case for other signals which appear later.

The saturation histogram generating unit 13 generates a saturation histogram HSTa representing a distribution of the saturation SAa, and supplies it to the saturation conversion function generating unit 14.

The saturation conversion function generating unit 14 generates a saturation conversion function Fa from the saturation histogram HSTa input from the saturation histogram generating unit 13, and supplies the saturation conversion function Fa to the saturation conversion unit 15.

Using the saturation conversion function Fa, the saturation conversion unit 15 converts the saturation SAa input via the saturation signal delay unit 16 from the color feature quantity calculation unit 12, and outputs the converted saturation SAb to the color component value calculation unit 19.

From the converted saturation SAb supplied from the saturation conversion unit 15, and the hue HUa and the brightness VAa supplied via the hue signal delay unit 17 and the brightness signal delay unit 18 from the color feature quantity calculation unit 12, the color component value calculation unit 19 calculates red, green and blue color component values ROUT, GOUT, BOUT, and outputs color signals ROUT, GOUT, BOUT indicating the calculated color component values ROUT, GOUT, BOUT via the output terminals 20$r$, 20$g$, 20$b$.

The saturation signal delay unit 16 is provided to synchronize the input of the saturation signal SAa output from the color feature quantity calculation unit 12 to the saturation conversion unit 15, with the input of the saturation conversion function Fa from the saturation conversion function generating unit 14 to the saturation conversion unit 15.

The hue signal delay unit 17 and the brightness signal delay unit 18 are provided to synchronise the input of the hue signal HUa and the brightness signal VAa output from the color feature quantity calculation unit 12 to the color component value calculation unit 19, with the input of the saturation signal SAb from the saturation conversion unit 15 to the color component value calculation unit 19.

The red, green and blue color signals ROUT, GOUT, BOUT output via the output terminals 20$r$, 20$g$, 20$b$ from the color component value calculation unit 19 are supplied to the display unit 40.

The display unit 40 displays video based on the red, green and blue color signals ROUT, GOUT, BOUT.

Each function will now be described in further detail.

The color signals RIN, GIN, BIN input to the input terminals 11$r$, 11$g$, 11$b$ represent red, green and blue color component values for each pixel.

The color feature quantity calculation unit 12 calculates the saturation SAa, the hue HUa, and the brightness VAa from the color component values RIN, GIN, BIN represented by the color signals input to the input terminals 11$r$, 11$g$, 11$b$. The calculations are performed in a method commonly used.

On the basis of the saturation signal SAa from the color feature quantity calculation unit 12, the saturation histogram generating unit 13 generates the saturation histogram HSTa representing the distribution of the saturation SAa.

In the generation of the saturation histogram HSTa, the frequency of occurrences Da of the gradation values representing the saturation SAa for each class CLa is counted for a predetermined period or range, e.g., for a frame. The frequency of occurrences of the gradation values means the frequency of occurrences of the pixels having the gradation values. The frequency of occurrences Da of the gradation values in the class CLa is represented by "Da(CLa)". Similar notation is used for other values. The frequency of occurrences of the gradation value in the class CLa may also be simply referred to as the frequency of the class CLa.

Each class CLa consists of a single gradation value, or a plurality of gradation values which are consecutive to each other, and the classes do not overlap each other. In the following description, each class is assumed to consist of a single gradation value. In this case, each class is identified by the gradation value belonging to the class.

Taking account of the temporal fluctuation of the video signal, the frequency of occurrences of the saturation over a plurality of frames may be determined, and divided by the number of the frames to obtain the frequency of occurrences per frame.

From the saturation histogram HSTa input from the saturation histogram generating unit 13, the saturation conversion function generating unit 14 generates the saturation conversion function Fa, and supplies it to the saturation conversion unit 15.

The saturation conversion function Fa takes given saturation (input saturation) SAa as a variable, and outputs a value of the converted saturation (output saturation) SAb by returning the value of the function Fa corresponding to the variable, that is, it defines a relation between the input saturation SAa and the output saturation SAb.

For example, the saturation conversion function Fa can be generated by cumulatively adding the frequency for each class CLa in the saturation histogram HSTa from the low end of the classes CLa (from the low end of the gradation values belonging to the classes), and adopting the cumulatively added value up to a particular class, as the value of the function corresponding to a representative value of the particular class, e.g., the largest value among the gradation values belonging to the particular class. When each class consists of a single gradation value, the gradation value belonging to the class is the representative value of the class.

In the generation of the saturation conversion function Fa, at least one of a maximum value and a minimum value may be predefined for the slope of the saturation conversion function Fa (ratio of the increment in the output saturation SAb to the increment in the input saturation SAa). For instance, an adjustment may be so made that the above-mentioned slope is not larger than the predefined maximum value and not smaller than the predefined minimum value.

The adjustment is made by, for example, presetting an upper limit value and a lower limit value for the frequency Da(CLa) of each class CLa in the saturation histogram HSTa used in the generation of the saturation conversion function Fa, corresponding to the maximum value and the minimum value for the slope, and redistributing the amount by which the frequency is larger than the upper limit value or is lower than the lower limit value.

The above-mentioned upper limit value corresponds to a product to the maximum value for the slope, the reciprocal of the number of classes, and the number of pixels used for the generation of the histogram, whereas the above-mentioned lower limit value corresponds to a product of the minimum value for the slope and the number of pixels used for the generation of the histogram.

For instance, when the frequency Da(CLa) of each class (class of interest) CLa exceeds the above-mentioned upper limit value, the amount by which the frequency exceeds is transferred to one or more other classes, so that the frequency of the class of interest CLa is reduced to become equal to the above-mentioned upper limit value, while the frequencies of the other classes are increased. For the transfer to two or more other classes, the excess amount is divided, and each division is allocated to another class, of which the frequency is increased by the amount of the allocation, while the frequency of the class of interest CLa is reduced by the amount of the allocation. By performing such a process for all other classes to which divisions are allocated, the frequency of the class of interest CLa is reduced by the total of the amounts of allocations to the other classes.

Conversely, when the frequency Da(CLa) of each class (class of interest) CLa is smaller than the lower limit value (falls short of the lower limit value), the amount by which the frequency is lower than the lower limit value (the amount of shortage) is transferred from one or more other classes, so that the frequency of the class of interest is increased to become equal to the above-mentioned lower limit value, while frequencies of the other classes are reduced.

For the transfer from two or more other classes, the amount of shortage is divided, and each division is allocated to another class, of which the frequency is reduced by the amount of the allocation, while the frequency of the class of interest CLa is increased by the amount of the allocation. By performing such a process for all other classes to which the divisions are allocated, the frequency of the class of interest CLa is increased by the total of the amounts of allocations to the other classes.

The transfer to the class of interest can be regarded as transfer of a negative value corresponding to the amount of shortage to the other classes.

The maximum value and the minimum value for the slope of the saturation conversion function Fa can be set independently for each of the saturation ranges. For instance, in the low saturation range (the range in which the saturation is not larger than a predetermined value), the maximum value may be set to a relatively small value, e.g., "1". Also, the constraint may be imposed by just one of the maximum value and the minimum value.

The determination of the amounts of the allocations for the purpose of the above-mentioned redistribution is so made that a curve representing the saturation conversion function Fa passes (0, 0) and (1.0, 1.0), and is continuous.

As an example, description is made of a case in which the saturation histogram HSTa representing the saturation distribution is as shown in FIGS. 3(*a*) to 3(*d*). In FIGS. 3(*a*) to 3(*d*), the horizontal axis represents the input saturation SAa, and hence the class CLa corresponding to each gradation value of the input saturation SAa, and the vertical axis represents the frequency of occurrences Da of the gradation values belonging to the class CLa consisting of the input saturation SAa.

In FIGS. 3(a) to 3(d), the input saturation SAa is indicated as a value normalized with respect to its maximum value. That is, the maximum value of the range of the values which can be assumed by the input saturation SAa is set to "1".

In both of FIG. 3(a) and FIG. 3(b), the average value SAam of the saturation SAa is 0.5, but the shape of the saturation distribution differs; in FIG. 3(a), the input saturation SAa is distributed densely in the intermediate saturation range, in FIG. 3(b), the input saturation SAa is scarce in the intermediate saturation range, and is densely distributed in the low saturation range and the high saturation range. In FIG. 3(c), the input saturation SAa is densely distributed in the low saturation range. In FIG. 3(d), the input saturation SAa is densely distributed in the high saturation range.

FIGS. 4(a) to 4(d) show the saturation conversion functions Fa respectively corresponding to the saturation distributions shown in FIGS. 3(a) to 3(d). In FIGS. 4(a) to 4(d), the horizontal axis represents the input saturation SAa, and the vertical axis represents the output saturation SAb corresponding to the input saturation SAa, i.e., the value Fa(SAa) of the saturation conversion function Fa corresponding to the input saturation SAa. In FIGS. 4(a) to 4(d), as in FIGS. 3(a) to 3(d), the maximum value of the range of values which can be assumed by the input saturation SAa is set to "1", and the maximum value of the range of values which can be assumed by the output saturation SAb is also set to "1".

Each of the saturation conversion functions Fa in FIGS. 4(a) to 4(d) is so generated that its slope is within the range from the predetermined minimum value to the predetermined maximum value. The adjustment for having the slope to be within a predetermined range is made by the redistribution of the frequencies among the classes as described above. The redistribution is so made that the curve representing the saturation conversion function Fa passes (0, 0) and (1.0, 1.0), and is continuous.

A specific manner of the redistribution may be similar to a method of redistribution of the frequencies for the generation of the saturation conversion coefficient determination function which will later be described in connection with a second embodiment.

The generation of the saturation conversion function Fa by the saturation conversion function generating unit 14 is performed frame by frame.

When the saturation histogram generating unit 13 generates the saturation histogram HSTa based on the saturation SAa of the pixels in each frame, the saturation SAa of the pixels in the same frame is used to generate the saturation conversion function Fa pertaining to the same frame.

When the saturation histogram generating unit 13 generates the saturation histogram HSTa based on the saturation SAa of the pixels in a plurality of frames, the saturation SAa of the pixels in the plurality of frames is used to generate the saturation conversion function Fa pertaining to the same frames.

Reference characters "Fa(f)" may be used to emphasize that the saturation conversion function Fa is one pertaining to each frame Fr(f).

The saturation signal delay unit 16 delays the saturation signal SAa for a time required by the saturation histogram generating unit 13 and the saturation conversion function generating unit 14 to perform the above-described processes to output the saturation conversion function Fa (the time from the input of the saturation signal SAa to the saturation histogram generating unit 13 up to the output of the saturation conversion function Fa from the saturation conversion function generating unit 14), and outputs the delayed saturation signal SAa to the saturation conversion unit 15, so that, when the saturation conversion function Fa(f) pertaining to a certain frame Fr(f) is input from the saturation conversion function generating unit 14 to the saturation conversion unit 15, the saturation signal SAa(f, x) for each pixel in the same frame Fr(f) is supplied to the saturation conversion unit 15.

Reference characters "SAa(f, x)" are used to emphasize that the saturation signal is one pertaining to each pixel Px(x) in the frame Fr(f). When such emphasis is not necessary, or in the explanation which applies to the saturation signal pertaining to any of a plurality of pixels, reference characters "SAa" is used. Also, reference characters SAa(x) may be used when it is not necessary to emphasize the frame including the pixel to which the saturation signal pertains. This applies to other reference characters.

The saturation conversion unit 15 converts the saturation SAa(f, x) of each pixel (pixel of interest) input from the color feature quantity calculation unit 12, by means of the above-mentioned saturation conversion function Fa(f), and outputs the converted saturation SAb(f, x) to the color component value calculation unit 19. By the conversion by means of the saturation conversion function Fa(f), the value of the function Fa(f), i.e., the output saturation SAb(f, x), corresponding to the saturation SAa(f, x) is output.

The saturation conversion by the saturation conversion unit 15 is a pixel-by-pixel process.

When the saturation SAa(f, x) of each pixel in each frame Fr(f) is converted by the saturation conversion unit 15 to determine the converted saturation SAb(f, x) of each pixel in each frame Fr(f), the saturation conversion function Fa(f) determined for the same frame Fr(f) is used.

The hue signal delay unit 17 and the brightness signal delay unit 18 delay the hue signal HUa and the brightness signal VAa for a time required by the saturation histogram generating unit 13 and the saturation conversion function generating unit 14 to perform the above-mentioned processes to output the saturation conversion function Fa(f), and, in addition, for the saturation conversion unit 15 to perform the above-mentioned process to output the converted saturation signal SAb (time from the input of the saturation signal SAa to the saturation histogram generating unit 13, up to the output of the converted saturation signal SAb from the saturation conversion unit 15), so that, when the saturation signal SAb(f, x) pertaining to a certain pixel Px(f, x) in a certain frame Fr(f) is supplied from the saturation conversion unit 15 to the color component value calculation unit 19, the hue signal HUa(f, x) and the brightness signal VAa(f, x) of the same pixel in the same frame are supplied to the color component value calculation unit 19.

Based on the saturation signal SAb output from the saturation conversion unit 15, and the hue HUa and the brightness VAa output from the color feature quantity calculation unit 12, the color component value calculation unit 19 outputs the color signals ROUT, GOUT, BOUT representing the red, green and blue color component values ROUT, GOUT, BOUT. This process is also performed pixel by pixel. That is, based on the saturation signal SAb(x) pertaining to each pixel (pixel of interest), and the hue signal HUa(x) and the brightness signal VAa(x) pertaining to the same pixel, the red, green and blue color signals ROUT(x), GOUT(x), BOUT(x) pertaining to the same pixel are output.

The calculation of the color component values ROUT, GOUT, BOUT is performed in a method commonly used.

Figure 4A:
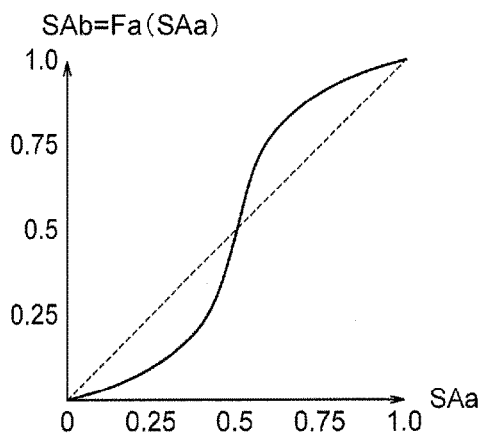
FIGS. 4(a) to 4(d) are diagrams showing examples of saturation conversion functions according to the present invention.
Figure 4B:
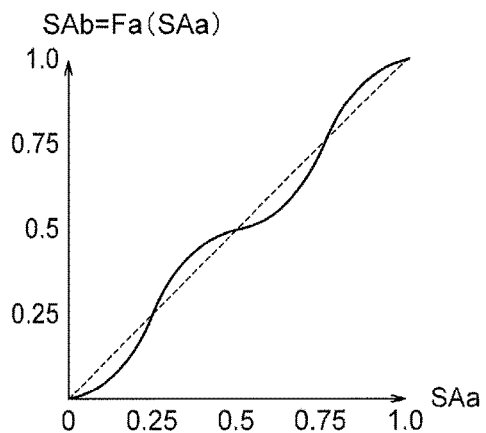
Figure 5A:
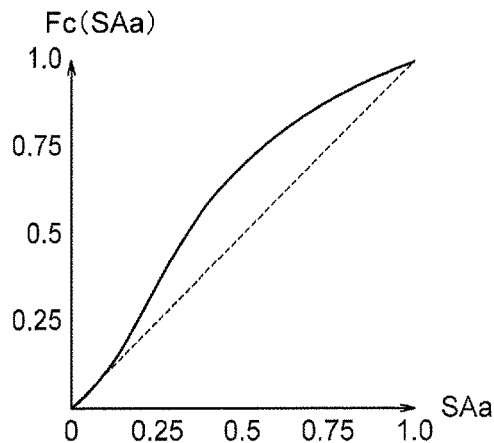
FIGS. 5(a) to 5(d) are diagrams showing examples of saturation conversion functions according to a conventional art.
Figure 5B:
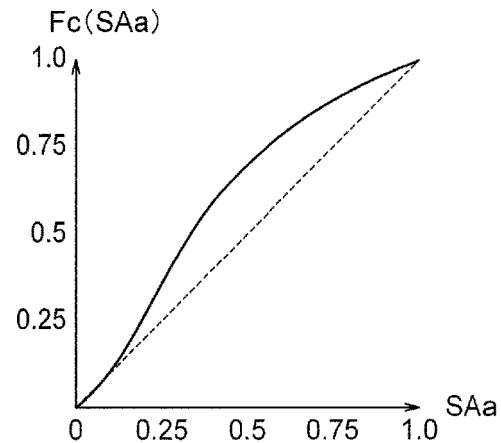

Effects of the first embodiment are now explained. FIGS. 5(a) to 5(d) show saturation conversion functions Fc according to a conventional art. FIGS. 5(a) to 5(d) are saturation conversion functions Fc respectively corresponding to the saturation distributions shown in FIGS. 3(a) to 3(d). In FIGS. 3(a) and 3(b), the average saturation is identical, so that the saturation conversion functions Fc according to the conventional art are identical as shown in FIGS. 5(a), 5(b), and, if the conversion is performed using these conversion functions, the saturation is enhanced throughout the entire range, but, in the intermediate saturation range in the case of FIG. 3(a), and in the high saturation range in the case of FIG. 3(b), where the distribution is dense, the spread of the distribution is narrowed as shown in FIG. 5(a) and FIG. 5(b), so that the color gradation expression is degraded. In contrast, by the saturation conversion according to the present embodiment (first embodiment), even in the intermediate saturation range in FIG. 3(a), and in the high saturation range in the case of FIG. 3(b), where the distribution is dense, the slope of the saturation conversion function Fa is increased, and the spread of the distribution is widened, as shown in FIGS. 4(a) and 4(b), so that a high color gradation expression can be achieved.

Figure 4C:
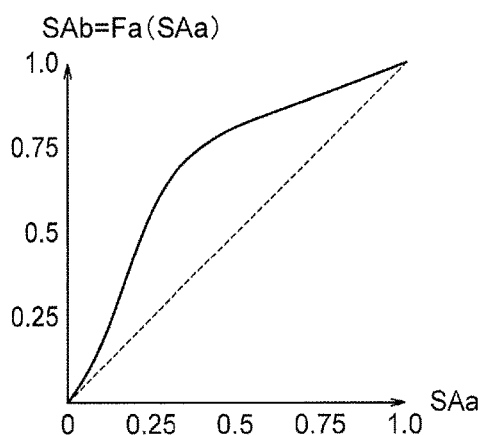
Figure 4D:
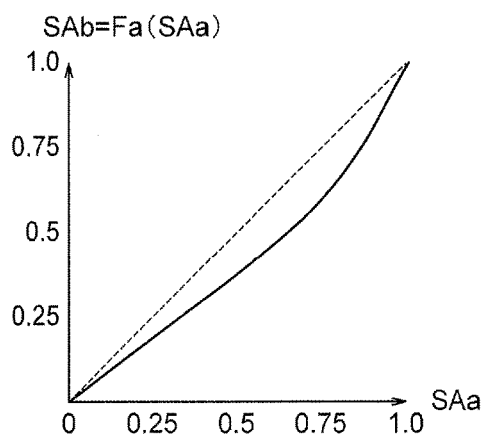
Figure 5C:
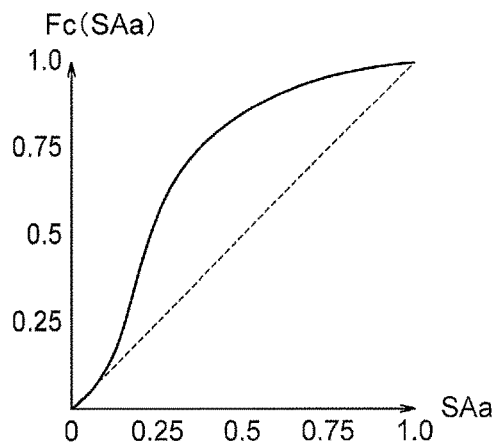
Figure 5D:
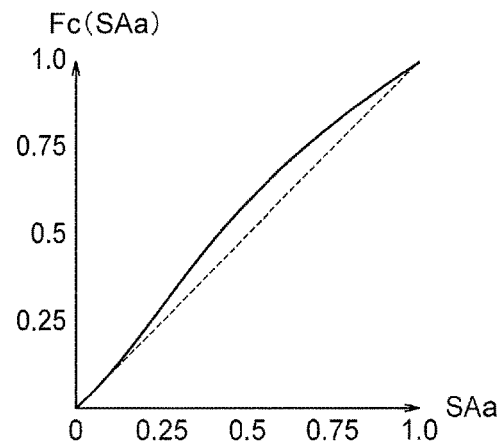

In the case where the input saturation SAa is densely distributed in the low saturation range as shown in FIG. 3(c), both the conventional art and the present embodiment can enhance the saturation in a similar manner, as shown in FIG. 5(c) and FIG. 4(c). In the case where the input saturation SAa is densely distributed in the high saturation range as shown in FIG. 3(d), the conventional art does nothing more than a process of refraining from increasing the saturation (process of making the slope of the saturation conversion function closer to 1), as shown in FIG. 5(d), whereas, according to the present embodiment, the slope of the saturation conversion function Fa can be made larger in the high saturation range as shown in FIG. 4(d), so that the distribution of the high saturation is widened, and a high color gradation expression can be achieved.

Also, by setting at least one of the maximum value and the minimum value for the slope of the saturation conversion function Fa for each saturation range, it is possible to have different conversion characteristics between different saturation ranges. For instance, by setting the maximum value for the slope of the saturation conversion function Fa in the low saturation range to be a small value (e.g., 1), increase of the saturation in the low saturation range can be restrained, and it is possible to prevent color noises or the like from becoming conspicuous.

Also, by setting the maximum value in the range of the intermediate saturation where there are many colors whose faithful reproduction is desired, to be a large value, it is possible to emphasize the differences between colors in the range of the intermediate saturation.

Furthermore, by setting the minimum value, it is possible to prevent the differences between colors from becoming too small, due to the reduction of the differences in the saturation. By setting the maximum value, abrupt change in the value of the function can be avoided.

Furthermore, by setting at least one of the maximum value and the minimum value for the slope of the saturation conversion function Fa for each saturation range, it is possible to control the saturation to be suitable for the characteristics of the display apparatus used, and the picture quality can be improved.

For instance, in the case of a display apparatus having a narrow color reproduction range, bright colors (colors with high saturation) cannot be displayed, but colors with medium saturation which appear more frequently in typical contents can be displayed more brightly (with higher saturation), so that by setting the minimum value for the intermediate saturation range to be a relatively large value, and setting the maximum value for the high saturation range to be a relatively small value, it becomes easier to generate an upwardly convex curve in the region from the intermediate saturation range to the high saturation range as shown in FIG. 4(a).

A feature of the present invention is that the saturation conversion function (the curve represented by such a function) is varied according to the input video. But, in addition, by controlling at least one of the maximum value and the minimum value for the slope of the function, the saturation conversion function can be made to be suitable for the characteristic of the display apparatus.

In the above-described example, each class of the saturation histogram HSTa consists of a single gradation value. But the configuration may be such that each class consists of a plurality of gradation values.

Second Embodiment

Figure 6:
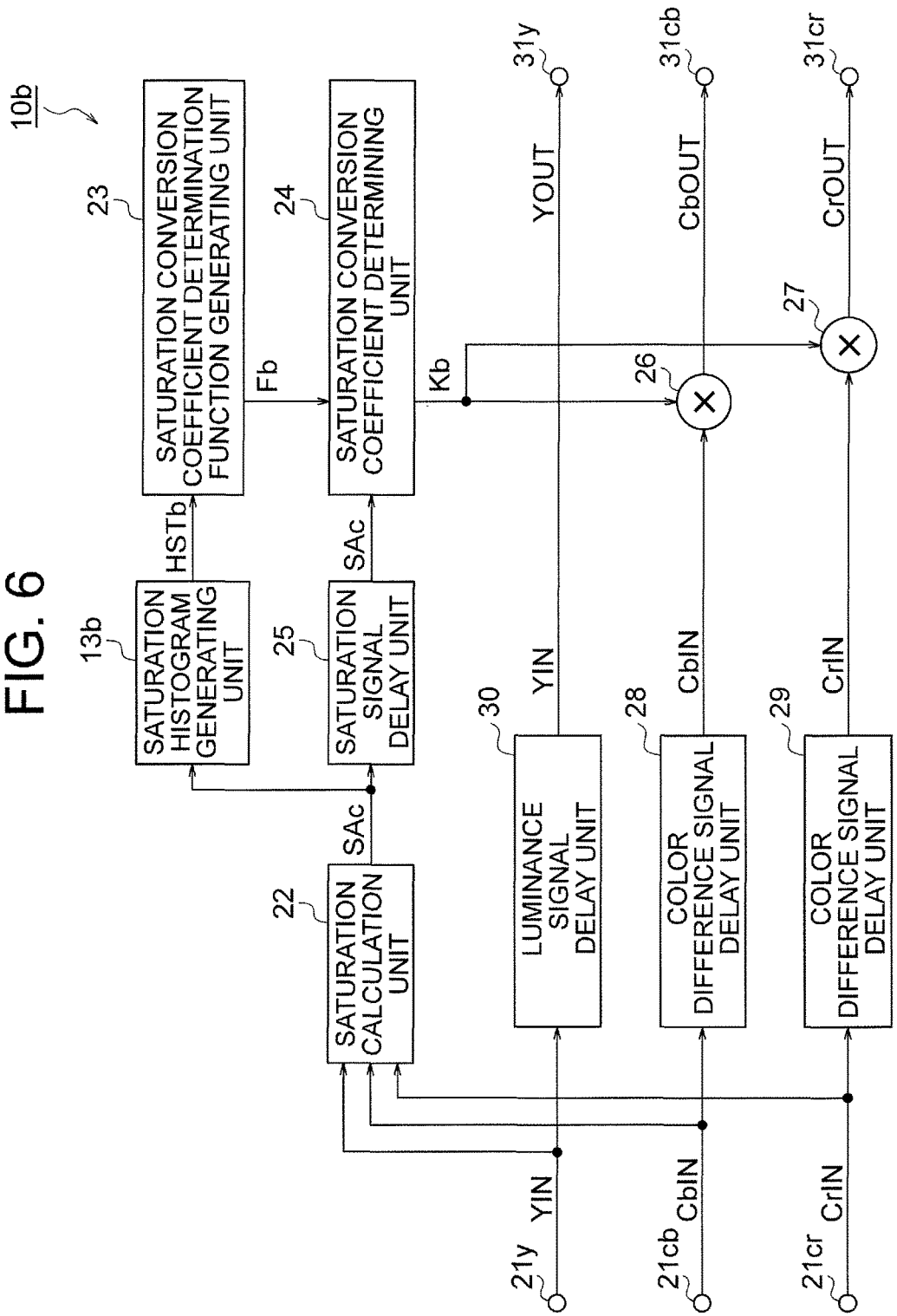
FIG. 6 is a block diagram showing a configuration of an image processing apparatus according to a second embodiment of the present invention.

FIG. 6 is a block diagram showing a configuration of an image processing apparatus 10b of a second embodiment of the present invention. The illustrated image processing apparatus 10b includes input terminals 21y, 21cb and 21cr, a saturation calculation unit 22, a saturation histogram generating unit 13b, a saturation conversion coefficient determination function generating unit 23, a saturation conversion coefficient determining unit 24, a saturation signal delay unit 25, color difference signal delay units 28, 29, a luminance signal delay unit 30, multipliers 26, 27, and output terminals 31y, 31cb, 31cr.

Input to the input terminals 21y, 21cb, 21cr is a video signal which can be handled by the image display apparatus such as a television set or a computer. In the present embodiment, the video signal is assumed to be formed, for example, of a luminance signal YIN, a color difference (blue) signal CbIN, and a color difference (red) signal CrIN.

The image processing apparatus 10b shown in FIG. 6 can be used in place of the image processing apparatus 10 in FIG. 2. However, it receives the video signal comprising the luminance signal YIN, and the color difference signals CbIN, CrIN, and outputs a luminance signal YOUT, and color difference signals CbOUT, CrOUT. Accordingly, as the display unit 40, one which can accept, as inputs, the luminance signal YOUT, and the color difference signals CbOUT, CrOUT is used.

Based on the luminance signal YIN and the color difference signals CbIN, CrIN received at the input terminals 21y, 21cb, 21cr, the saturation calculation unit 22 calculates saturation SAc, and supplies a saturation signal SAc representing the saturation SAc to the saturation histogram generating unit 13b, and outputs the saturation signal SAc via the saturation signal delay unit 25 to the saturation conversion coefficient determining unit 24.

The saturation histogram generating unit 13b generates a saturation histogram HSTb representing the distribution of the saturation SAc, and outputs the saturation histogram HSTb to the saturation conversion coefficient determination function generating unit 23.

Based on the saturation histogram HSTb input from the saturation histogram generating unit 13b, the saturation conversion coefficient determination function generating unit 23 generates a saturation conversion coefficient determination function Fb, and outputs the saturation conversion coefficient determination function Fb to the saturation conversion coefficient determining unit 24.

Based on the saturation signal SAc input via the saturation signal delay unit 25 from the saturation calculation unit 22, and the saturation conversion coefficient determination function Fb input from the saturation conversion coefficient determination function generating unit 23, the saturation conversion coefficient determining unit 24 determines a saturation conversion coefficient Kb, and outputs it to the multipliers 26, 27.

The multipliers 26 and 27 multiply the color difference signals CbIN and CrIN respectively supplied via the color difference signal delay units 28 and 29 from the input terminals 21cb and 21cr, by the saturation conversion coefficient Kb input from the saturation conversion coefficient determining unit 24, and output the results of the multiplication as the output color difference signals CbOUT and CrOUT to the output terminals 31cb and 31cr.

The luminance signal YIN input at the input terminal 11y is delayed by the luminance signal delay unit 30, and output from the output terminal 31y as the output luminance signal YOUT.

The saturation signal delay unit 25 is provided to synchronize the input of the saturation signal SAc output from the saturation calculation unit 22, to the saturation conversion coefficient determining unit 24, with the input of the saturation conversion coefficient determination function Fb from the saturation conversion coefficient determination function generating unit 23 to the saturation conversion coefficient determining unit 24.

The color difference signal delay units 28 and 29 are provided to synchronize the input of the color difference signals CbIN and CrIN respectively input at the input terminals 21cb and 21cr, to the multipliers 26 and 27, with the input of the saturation conversion coefficient Kb from the saturation conversion coefficient determining unit 24 to the multipliers 26 and 27.

The luminance signal delay unit 30 is provided to synchronize the output of the luminance signal YIN input at the input terminal 21y to the output terminal 31y, with the output of the color difference signals CbOUT and CrOUT from the multipliers 26 and 27 to the output terminals 31cb and 31cr.

Each function will now be described in further detail.

The luminance signal YIN input to the input terminal 21y represents the luminance value of each pixel. The color difference signals CbIN, CrIN input to the input terminals 21cb, 21cr represent color difference component values of each pixel.

Based on the luminance signal YIN, and the color difference signals CbIN, CrIN input to the input terminals 21y, 21cb, 21cr, the saturation calculation unit 22 calculates the saturation SAc. This calculation is performed in a method commonly used.

As in the first embodiment, the saturation histogram generating unit 13b generates the saturation histogram HSTb representing the distribution of the saturation SAc.

In the generation the saturation histogram HSTb, the frequency of occurrences Db of the gradation values representing the saturation SAc for each class CLb is counted for a predetermined range, e.g., for a frame. The frequency Db of a class CLb is represented by "Db(CLb)".

Each class CLb consists of a single gradation value, or a plurality of consecutive gradation values, and the classes do not overlap each other. In the following description, it is assumed that the gradation value is represented by 10 bits and takes one of values from 0 to 1023, and the gradation values are divided into 16 classes, and each class consists of 64 gradation values.

Taking account of the temporal fluctuation of the video signal, the frequency of occurrences of the saturation over a plurality of frames may be determined, and divided by the number of the frames to obtain the frequency of occurrences per frame.

From the saturation histogram HSTb input from the saturation histogram generating unit 13b, the conversion coefficient determination function generating unit 23 generates the saturation conversion coefficient determination function Fb, and supplies it to the saturation conversion coefficient determining unit 24.

The saturation conversion coefficient determination function Fb takes given saturation (input saturation) SAc as a variable, and outputs the saturation conversion coefficient Kb by returning a ratio Ks of the value SAd of the function Fb corresponding to the input saturation SAc, to the input saturation SAc.

For example, the saturation conversion coefficient determination function Fb can be generated by cumulatively adding the frequency Db(CLb) for each class CLb in the saturation histogram HSTb from the low end of the classes CLb (from the low end of the gradation values belonging to the classes), and adopting the cumulatively added value up to a particular class, as the value of the function corresponding to a representative value of the particular class, e.g., the largest value among the gradation values belonging to the particular class.

In the generation of the saturation conversion coefficient determination function Fb, at least one of a maximum value and a minimum value may be predefined for the slope of the saturation conversion coefficient determination function Fb (ratio of the increment in the function Fb to the increment in the input saturation SAc). For instance, an adjustment may be so made that the above-mentioned slope is not larger than the predefined maximum value and not smaller than the predefined minimum value.

The adjustment is made by, for example, presetting an upper limit value and a lower limit value for the frequency Db (CLb) of each class CLb in the saturation histogram HSTa used in the generation of the saturation conversion coefficient determination function Fb, corresponding to the maximum value and the minimum value for the slope, and redistributing the amount by which the frequency is larger than the upper limit value or is lower than the lower limit value.

The above-mentioned upper limit value corresponds to a product to the maximum value for the slope, and the number of pixels used for the generation of the histogram, whereas the above-mentioned lower limit value corresponds to a product of the minimum value for the slope and the number of pixels used for the generation of the histogram.

For instance, when the frequency Db(CLb) of each class (class of interest) CLb exceeds the above-mentioned upper limit value, the amount by which the frequency exceeds is transferred to one or more other classes, so that the frequency of the class of interest CLb is reduced to become equal to the above-mentioned upper limit value, while the frequencies of the other classes are increased.

For the transfer to two or more other classes, the excess amount is divided, and each division is allocated to another class, of which the frequency is increased by the amount of the allocation, while the frequency of the class of interest CLb is reduced by the amount of the allocation. By performing such a process for all other classes to which divisions are allocated, the frequency of the class of interest CLb is reduced by the total of the amounts of allocations to the other classes.

Conversely, when the frequency Db(CLb) of each class (class of interest) CLb is smaller than the lower limit value (falls short of the lower limit value), the amount by which the frequency is lower than the lower limit value (the amount of shortage) is transferred from one or more other classes, so that the frequency of the class of interest is increased to become equal to the above-mentioned lower limit value, while frequencies of the other classes are reduced.

For the transfer from two or more other classes, the amount of shortage is divided, and each division is allocated to another class, of which the frequency is reduced by the amount of the allocation, while the frequency of the class of interest CLb is increased by the amount of the allocation. By performing such a process for all other classes to which the divisions are allocated, the frequency of the class of interest CLb is increased by the total of the amounts of allocations to the other classes.

The transfer to the class of interest can be regarded as transfer of a negative value corresponding to the amount of shortage to the other classes.

The maximum value and the minimum value for the slope of the saturation conversion coefficient determination function Fb can be set independently for each of the saturation ranges. For instance, in the low saturation range (the range in which the saturation is not larger than a predetermined value), the maximum value may be set to a relatively small value, e.g., "1". Also, the constraint may be imposed by just one of the maximum value and the minimum value.

The determination of the amounts of the allocations for the purpose of the above-mentioned redistribution is so made that a curve representing the saturation conversion coefficient determination function Fb passes (0, 0) and (1.0, 1.0), and is continuous.

Figure 7:
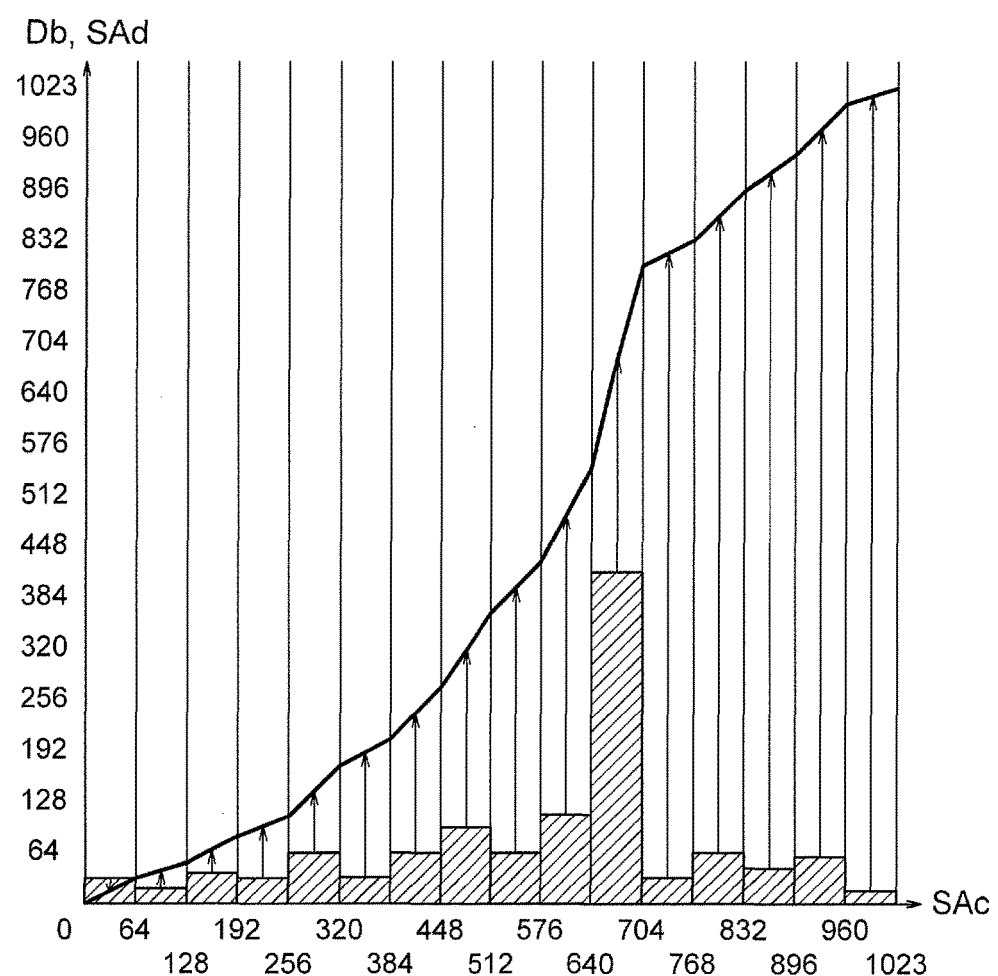
FIG. 7 is a diagram showing an example of saturation distribution and a saturation conversion coefficient determination function.

FIG. 7 depicts the distribution of the saturation, and the saturation conversion coefficient determination function Fb.

The bar graph in FIG. 7 represents the frequency of occurrences Db of each class in the saturation histogram HSTb, and the line graph represents the value SAd of the saturation conversion coefficient determination function Fb. The saturation conversion coefficient determination function Fb is so generated that in the areas where the frequency of occurrences is high, the slope of the saturation conversion coefficient determination function Fb is large.

The saturation conversion coefficient determination function Fb is obtained in a manner similar to the manner in which the saturation conversion function Fa is obtained in the first embodiment. However, in the case of the saturation conversion function Fa, the relation between the input saturation SAa, and the value SAb of the function Fa (output saturation) corresponding to the input saturation SAa is used for the determination of the output saturation SAb, whereas in the case of the saturation conversion coefficient determination function Fb, the relation between the input saturation SAc, and the ratio Ks of the value of the function Fb (output saturation) corresponding to the input saturation SAc, to the input saturation SAc is used for the determination of the saturation conversion coefficient Kb. Specifically, the above-mentioned ratio Ks corresponding to the input saturation SAc is used as the saturation conversion coefficient Kb pertaining to the input saturation SAc.

Figure 8:
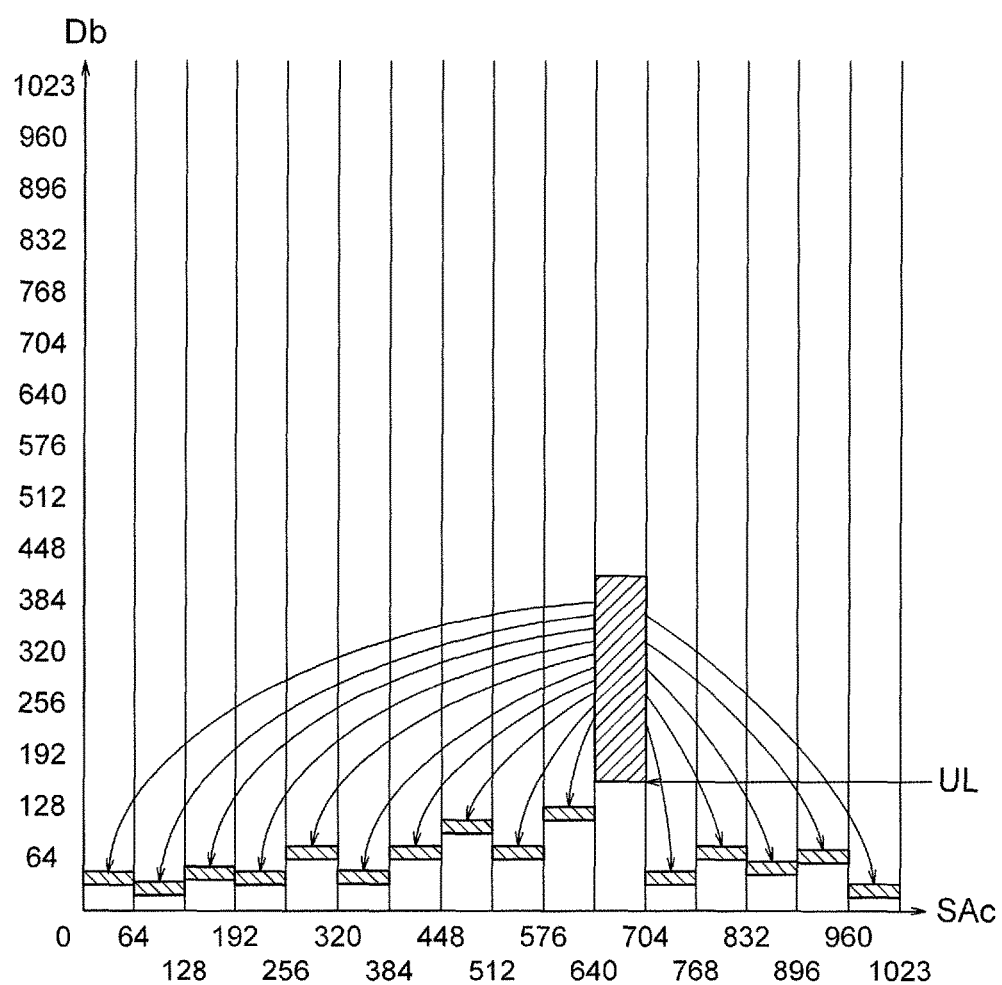
FIG. 8 is a diagram for explaining the case in which a maximum value is set for a slope of a curve representing a saturation conversion coefficient determination function.

As was mentioned above, in the generation of the saturation conversion coefficient determination function Fb, a maximum value may be set for the slope of the saturation conversion coefficient determination function Fb. FIG. 8 is a diagram for explaining the process for setting the maximum value for the slope of the saturation conversion coefficient determination function Fb. In the present embodiment, in order to prevent the slope from exceeding the maximum value, an upper limit value UL corresponding to the maximum value for the slope is set for the frequency of each class CLb, and when the upper limit value UL is exceeded, the excess is transferred to other classes. For instance, when the distribution of the saturation is as shown in FIG. 7, and the upper limit value UL is set as shown in FIG. 8, the frequency of the class of the gradation values of the saturation SAc from 640 to 704 exceeds the upper limit value. In such a case, the frequency of the class of the saturation gradation values from 640 to 704 is changed to the upper limit value UL, and the frequency by which the upper limit value UL is exceeded is transferred to other classes. For instance, it is divided among and transferred to 15 other classes. That is, the excess frequency is distributed.

In the distribution, the allocations may be equal among all the classes, or the allocations to closer classes may be made larger. The saturation distribution (adjusted histogram) newly generated in this manner may be used for the generation of the saturation conversion coefficient determination function Fb.

The generation of the saturation conversion coefficient determination function Fb by the saturation conversion coefficient determination function generating unit 23 is performed frame by frame.

When the saturation histogram generating unit 13b generates the saturation histogram HSTb based on the saturation SAc of the pixels in each frame, the saturation SAc of the pixels in the same frame is used to generate the saturation conversion coefficient determination function Fb pertaining to the same frame.

When the saturation histogram generating unit 13b generates the saturation histogram HSTb based on the saturation SAc of the pixels in a plurality of frames, the saturation SAc of the pixels in the plurality of frame is used to generate the determination function Fb pertaining to the same frames.

Reference characters Fb(f) may be used to emphasize that the saturation conversion coefficient determination function Fb is one pertaining to each frame Fr(f).

The saturation signal delay unit 25 delays the saturation signal SAc for a time required by the saturation histogram generating unit 13b and the saturation conversion coefficient determination function generating unit 23 to perform the above-described processes to output the saturation conversion coefficient determination function Fb (the time from the input of the saturation signal SAc to the saturation histogram generating unit 13b, up to the output of the saturation conversion coefficient determination function Fb from the saturation conversion coefficient determination function generating unit 23), and outputs delayed saturation signal to the saturation conversion coefficient determining unit 24, so that, when the saturation conversion coefficient determination function Fb(f) pertaining to a certain frame Fr(f) is input from the saturation conversion coefficient determination function generating unit 23 to the saturation conversion coefficient determining unit 24, the saturation signal SAc(f, x) for each pixel in the same frame is supplied to the saturation conversion coefficient determining unit 24.

Referring to the saturation conversion coefficient determination function Fb generated in the above-described method, the saturation conversion coefficient determining unit determines the saturation conversion coefficient Kb corresponding to the saturation signal SAc input from the saturation calculation unit 22. The determination of the saturation conversion coefficient Kb is a pixel-by-pixel process. That is, for the saturation SAc(f, x) of each pixel (pixel of interest) in each frame, the corresponding saturation conversion coefficient Kb(f, x) is determined.

When the saturation conversion coefficient Kb(f, x) is determined from the saturation SAc(f, x) of each pixel in each frame Fr(f), the saturation conversion coefficient determination function Fb(f) determined for the same frame Fr(f) is used.

Figure 9:
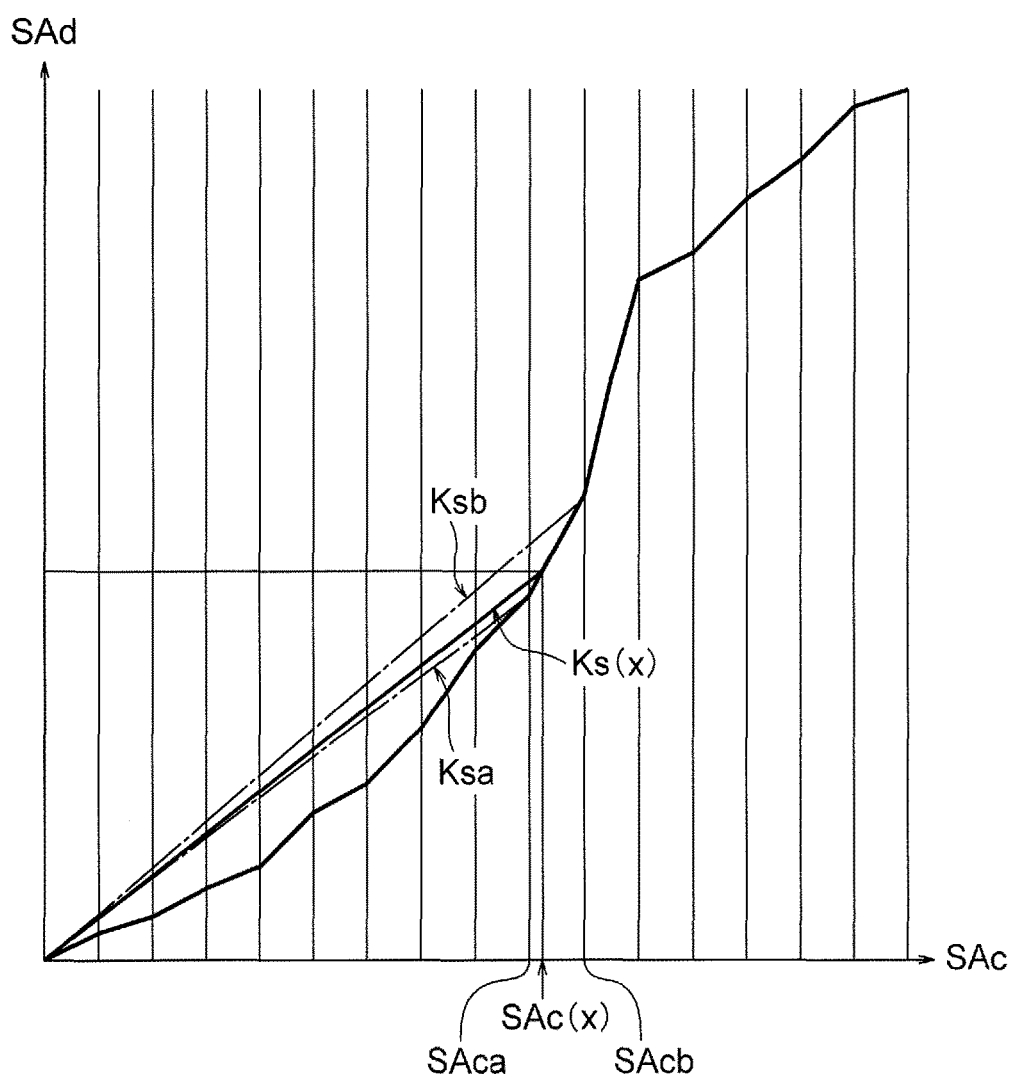
FIG. 9 is a diagram for explaining a saturation conversion coefficient determining unit 24.

FIG. 9 is a diagram for explaining the saturation conversion coefficient determining unit 24.

The line graph in FIG. 9 represents the saturation conversion coefficient determination function Fb. The break points of the line graph represent the representative values of the respective classes by their horizontal positions, and their vertical positions represent the values of the function corresponding to the representative values.

The ratio Ks (=SAd/SAc) of value of the function, that is the output saturation SAd(=Fb(SAc)), to the input saturation SAc corresponding to each break point on the line graph represents the saturation conversion coefficient Kb for the input saturation SAc.

Accordingly, when the input saturation SAc(x) of the pixel of interest coincides with any of the input saturation SAci corresponding to the 16 break points Qi (i=1 to 16), the ratio Ks(=SAdi/SAci) of the output saturation SAdi(=Fb(SAci)) to the input saturation SAc is the saturation conversion coefficient Kb(x) pertaining to the pixel of interest.

When the input saturation SAc(x) of the pixel of interest does not coincide with any of the input saturation SAci corresponding to the 16 break points, the ratio Ks(x) corresponding to the input saturation SAc(x) is determined by interpolation from the ratios Ksa, Ksb corresponding to the input saturation SAca, SAcb corresponding to the break points positioned on both sides of the input saturation SAc(x), and the ratio Ks(x) thus determined is used as the saturation conversion coefficient Kb(x) for the pixel of interest Px(x).

The interpolation of the ratio Ks(x) can be expressed by the following equation (1).

$$Ks(x)=(Ksa \times Db+Ksb \times Da)/(Da+Db) \quad (1)$$

In the equation (1), Da, Db are given by:

$$Da=SAc(x)-SAca$$

$$Db=SAcb-SAc(x)$$

Instead of determining the ratio Ks(x) by interpolation, as described above, the output saturation SAd(x) corresponding to the input saturation SAc(x) pertaining to the pixel of interest Px(x) may be determined by interplation, and the output saturation SAd(x) thus determined may be divided by the input saturation SAc(x) to determine the ratio, that is, the saturation conversion coefficient Kb(x) pertaining to the pixel of interest Px(x). Such a process is equivalent to the determination of the ratio Ks(x) by interpolation.

Specifically, when the input saturation SAc(x) for the pixel of interest does not coincide with any of the saturation SAci corresponding to the 16 breakpoints, the output saturation SAd(x) corresponding to the input saturation SAc(x) is determined by interpolation, from the values of the function, that is, the output saturation SAda, SAdb, corresponding to the input saturation SAca, SAcb, corresponding to the breakpoints positioned on both sides of the input saturation SAc(x), and the ratio Ks(x) of the output saturation SAd(x) to the input saturation SAc(x) is used as the saturation conversion coefficient Kb(x) pertaining to the pixel of interest.

The interpolation of the output saturation SAd(x) can be expressed by the following equation (2).

$$SAd(x)=(SAd(a) \times Db+SAd(b) \times Da)/(Da+Db) \quad (2)$$

By dividing the output saturation SAd(x) obtained according to the equation (2), by the input saturation SAc(x), the saturation conversion coefficient Kb(x) pertaining to the pixel of interest can be obtained. This computation can be expressed by the following equation (3).

$$Kb(x)=SAd(x)/SAc(x) \quad (3)$$

The color difference signal delay units 28 and 29 respectively delay the color difference signals CbIN and CrIN respectively input at the input terminals 21cb and 21cr, for a time required for the processes at the saturation calculation unit 22, the saturation histogram generating unit 13b, the saturation conversion coefficient determination function generating unit 23, and the saturation conversion coefficient determining unit 24 (the time from the input of the color difference signals CbIN, CrIN to the input terminals 21cb and 21cr, up to the output of the saturation conversion coefficient Kb), and output the delayed signals to the multipliers 26 and 27, so that, when the saturation conversion coefficient Kb(f, x) pertaining to a certain pixel Px(x) in a certain frame Fr(f) is supplied from the saturation conversion coefficient determining unit 24 to the multipliers 26 and 27, the color difference signals CbIN(f, x) and CrIN(f, x) for the same pixel in the same frame are supplied to the multipliers 26 and 27.

The multipliers 26 and 27 respectively multiply the color difference signals CbIN(f, x) and CrIN(f, x) of each pixel (pixel of interest) output from the color difference signal delay units 28 and 29, by the saturation conversion coefficient Kb(f, x) pertaining to the same pixel in the same frame output from the saturation conversion coefficient determining unit 24, and outputs the results of the multiplication as the output color difference signals CbOUT(f, x) and CrOUT (f, x) pertaining to the same pixel.

The luminance signal delay unit 30 delays the luminance signal YIN input at the input terminal 21y, for a time required for the processes at the saturation calculation unit 22, the saturation histogram generating unit 13b, the saturation conversion coefficient determination function generating unit 23, the saturation conversion coefficient determining unit 24, and the multipliers 26, 27 (the time from the input of the luminance signal YIN, and the color difference signals CbIN, CrIN to the input terminals 21y, 21cb, 21cr, up to the output of the output color difference signals CbOUT, CrOUT), and outputs the delayed signal to the output terminal 31y, so that, when the color difference signals CbOUT(f, x) and CrOUT(f, x) pertaining a certain pixel Px(x) in a certain frame Fr(f) are supplied from the multipliers 26 and 27 to the output terminals 31cb and 31cr, the luminance signal YIN(f, x) of the same pixel in the same frame is supplied to the output terminal 31y.

Effects of the second embodiment are now explained. According to the present embodiment, the saturation conversion coefficient determination function Fb is generated, and the saturation conversion coefficient is determined from the saturation conversion coefficient determination function Fb, and the saturation conversion coefficient thus determined is used for the multiplication of the color difference signals. By performing the multiplication of the color difference signals, the saturation can be enhanced, while at the same time, calculation of the hue or the brightness is unnecessary, so that the size of the circuit, specifically integrated circuit, can be reduced. As a result, the cost can be lowered.

Also, the method of generating the saturation conversion coefficient determination function Fb, the value for referring to the saturation conversion coefficient determination function Fb, and the values multiplied by the determined saturation conversion coefficient can be selected independently, so that the versatility is high. Here, the "values multiplied by the determined saturation conversion coefficient" are CbIN, CrIN, in the example of FIG. 6. The "value for referring to the saturation conversion coefficient determination function Fb" is the saturation SAc. What is meant by they "can be selected independently" is that even if the values other than those described above are selected, similar processes can be applied.

Also, by setting at least one of the maximum value and the minimum value for the slope of the saturation conversion coefficient determination function Fb for each saturation range, it is possible to have different conversion characteristics between different saturation ranges. For instance, by setting the maximum value for the slope of the saturation conversion coefficient determination function Fb in the low saturation range to be a small value (e.g., 1), increase of the saturation in the low saturation range can be restrained, and it is possible to prevent color noises or the like from becoming conspicuous.

Also, by setting the maximum value in the range of the intermediate saturation where there are many colors whose faithful reproduction is desired, to be a large value, it is possible to emphasize the differences between colors in the range of the intermediate saturation.

Furthermore, by setting the minimum value, it is possible to prevent the differences between colors from becoming too small, due to the reduction of the differences in the saturation. By setting the maximum value, abrupt change in the value of the function can be avoided.

Furthermore, by setting at least one of the maximum value and the minimum value for the slope of the saturation conversion coefficient determination function <for each saturation range>, it is possible to control the saturation to be suitable for the characteristics of the display apparatus used, and the picture quality can be improved.

For instance, in the case of a display apparatus having a narrow color reproduction range, bright colors (colors with high saturation) cannot be displayed, but colors with medium saturation which appear more frequently in typical contents can be displayed more brightly (with higher saturation), so that by setting the minimum value for the intermediate saturation range to be a relatively large value, and setting the maximum value for the high saturation range to be a relatively small value, it becomes easier to generate an upwardly convex curve in the region from the intermediate saturation range to the high saturation range as shown in FIG. 7.

A feature of the present invention is that the saturation conversion coefficient determination function (the curve represented by such a function) is varied according to the input video. But, in addition, by controlling at least one of the maximum value and the minimum value for the slope of the function, the saturation conversion coefficient determination function can be made to be suitable for the characteristic of the display apparatus.

In the second embodiment, each class of the saturation histogram HSTb consists of 64 gradation values. But the number of the gradation values belonging to each class may be other than 64. Each class of the histogram HSTb may consists of a single gradation value, as in the first embodiment. In such a case, the process for interpolating the ratio of the output saturation to the input saturation described with reference to FIG. 9 is unnecessary.

In the first embodiment, the color component values ROUT, GOUT, BOUT are calculated using the converted saturation SAb generated by performing the saturation conversion at the saturation conversion unit 15. But, the calculation of the color component values from the saturation, the hue and the brightness generally requires complicated processes, and hence large-sized circuits. This is also true when the luminance and the color differences are calculated from the saturation, the hue and the brightness.

In the second embodiment, the conversion of the saturation is realized by performing the conversion of the color difference signals CbIN, CrIN using the saturation conversion coefficient Kb. That is, the conversion of the saturation is realized without performing the conversion of the signal representing the saturation SAc. In the second embodiment, neither the conversion of the saturation for the calculation of the luminance YOUT and color difference GbOUT, CrOUT, nor the calculation based on the converted saturation is required, so that the processes are relatively simple, and the size of the circuits for performing the processes can be reduced.

Third Embodiment

Figure 10:
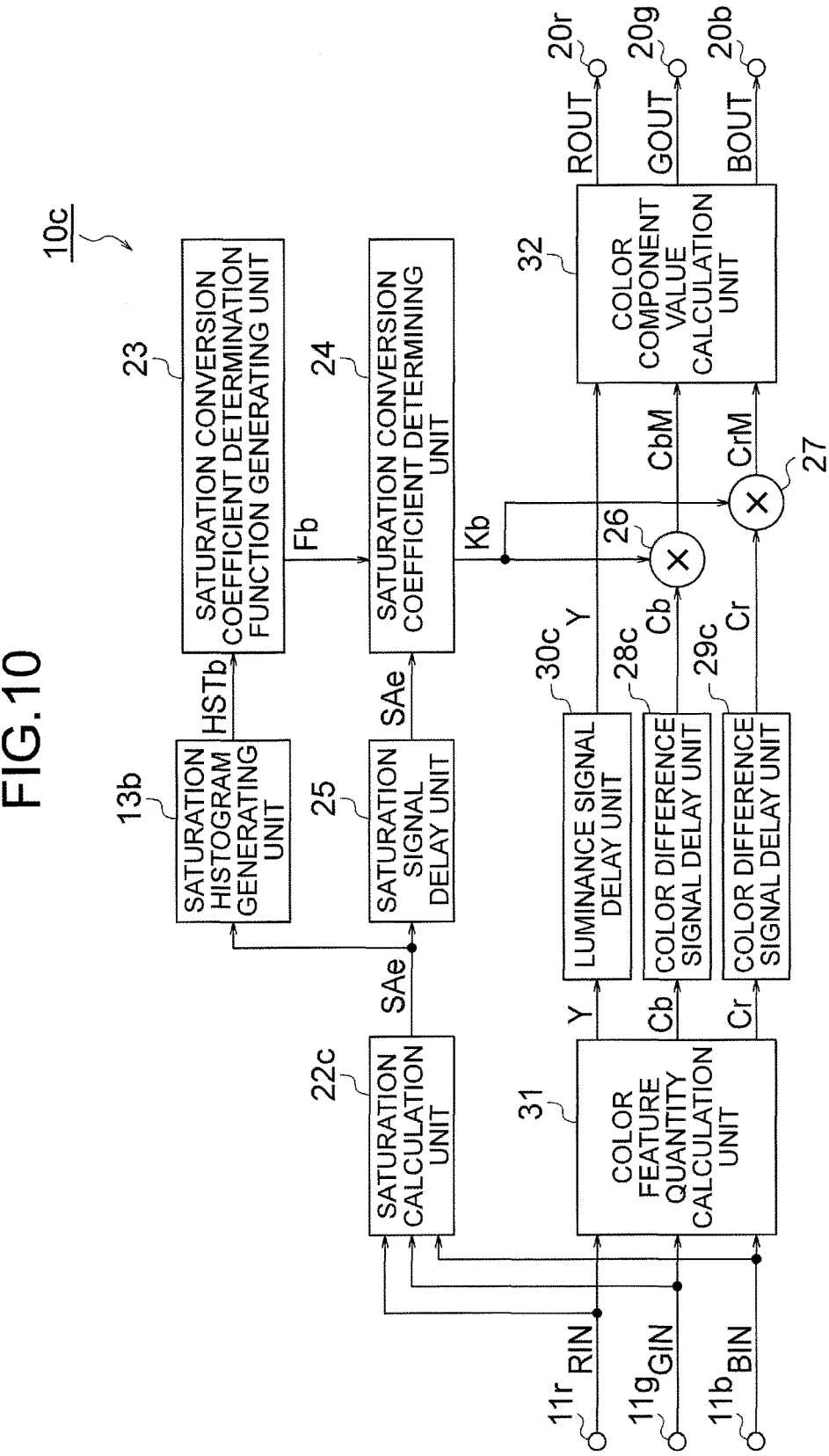
FIG. 10 is a block diagram showing a configuration of an image processing apparatus according to a third embodiment of the present invention.

FIG. 10 is a block diagram showing a configuration of an image processing apparatus 10*c* according to a third embodiment of the present invention. The illustrated image processing apparatus 10*c* includes input terminals 11*r*, 11*g*, 11*b*, a saturation calculation unit 22, a saturation histogram generating unit 13*b*, a saturation conversion coefficient determination function generating unit 23, a saturation conversion coefficient determining unit 24, multipliers 26, 27, a color feature quantity calculation unit 31, a saturation signal delay unit 25, color difference signal delay units 28, 29, a luminance signal delay unit 30, a color component value calculation unit 32, and output terminals 20*r*, 20*g*, 20*b*.

Input to the input terminals 11*r*, 11*g*, 11*b* is a video signal which can be handled by the image display apparatus such as a television set, or a computer. In the present embodiment, the video signal is assumed to be formed, for example, of red, green and blue signals RIN, GIN, BIN.

The image processing apparatus 10*c* shown in FIG. 10 can be used in place of the image processing apparatus 10 in FIG. 2. Like the image processing apparatus 10, it receives the video signal comprising the color signals RIN, GIN, BIN, and outputs the color signals ROUT, GOUT, BOUT. Accordingly, as the display unit 40, one which can accept, as input, the color signals ROUT, GOUT, BOUT is used, as in the case in which the image processing apparatus 10 is used.

Based on the red, green and blue signals RIN, GIN, BIN received at the input terminals 11*r*, 11*g*, 11*b*, the saturation calculation unit 22 calculates saturation SAe, and outputs a saturation signal SAe representing the saturation SAe, to the saturation histogram generating unit 13*b* and the saturation conversion coefficient determining unit 24.

The saturation histogram generating unit 13*b* generates a saturation histogram HSTb representing the distribution of the saturation, and outputs the saturation histogram HSTb to the saturation conversion coefficient determination function generating unit 23.

Based on the saturation histogram HSTb, the saturation conversion coefficient determination function generating unit generates the saturation conversion coefficient determination function Fb, and outputs it to the saturation conversion coefficient determining unit 24.

Based on the saturation signal SAe input from the saturation calculation unit 22 via the saturation signal delay unit 25, and the saturation conversion coefficient determination function Fb input from the saturation conversion coefficient determination function generating unit 23, the saturation conversion coefficient determining unit 24 determines the saturation conversion coefficient Kb, and outputs it to the multipliers 26, 27.

From the red, green and blue signals RIN, GIN, BIN input to the input terminals 11*r*, 11*g*, 11*b*, the color feature quantity calculation unit 31 calculates the luminance signal Y, and the color difference signals Cb, Cr, and supplies the luminance signal Y via the luminance signal delay unit 30*c* to the color component value calculation unit 32, and supplies the color difference signals Cb, Cr via the color difference signal delay units 28*c*, 29*c* to the multipliers 26, 27.

The multipliers 26 and 27 multiply the color difference signals Cb and Cr supplied from the color feature quantity calculation unit 31 via the color difference signal delay units 28*c* and 29*c*, by the saturation conversion coefficient Kb input from the saturation conversion coefficient determining unit 24, and output the results of the multiplication, as intensified color difference signals CbM and CrM, to the color component value calculation unit 32.

The saturation signal delay unit 25 is provided to synchronize the input of the saturation signal SAe output from the saturation calculation unit 22*c* to the saturation conversion coefficient determining unit 24, with the input of the saturation conversion coefficient determination function Fb from the saturation conversion coefficient determination function generating unit 23 to the saturation conversion coefficient determining unit 24.

The color difference signal delay units 28*c* and 29*c* are provided to synchronize the input of the color difference signals Cb and Cr output from the color feature quantity calculation unit 31 to the multipliers 26 and 27, with the input of the saturation conversion coefficient from the saturation conversion coefficient determining unit 24 to the multipliers 26 and 27.

The luminance signal delay unit 30*c* is provided to synchronize the input of the luminance signal YIN output from the color feature quantity calculation unit 31 to the color component value calculation unit 32, with the input of the color difference signals CbM and CrM output from the multipliers 26 and 27 to the color component value calculation unit 32.

Based on the luminance signal Y input from the color feature quantity calculation unit 31 via the luminance signal delay unit 30*c*, and the color difference signals CbM, CrM input from the multipliers 26, 27, the color component value calculation unit 32 calculates the red, green and blue color component values ROUT, GOUT, BOUT, and outputs color signals ROUT, GOUT, BOUT representing the color component values ROUT, GOUT, BOUT, via the output terminals 20*r*, 20*g*, 20*b*.

Each function will now be described in further detail.

The calculation of the saturation at the saturation calculation unit 22 is performed in the same way as the calculation of the saturation at the color feature quantity calculation unit 12 in the first embodiment.

The generation of the saturation histogram HSTb by the saturation histogram generating unit 13*b* is performed in the same way as the generation of the saturation histogram HSTb by the saturation histogram generating unit 13 in the second embodiment.

The generation of the saturation conversion coefficient determination function Fb by the saturation conversion coefficient determination function generating unit 23 is performed in the same way as the generation of the saturation conversion coefficient determination function Fb by the saturation conversion coefficient determination function generating unit 23 in the second embodiment.

The saturation signal delay unit 25 delays the saturation signal SAe for a time required by the saturation histogram generating unit 13*b* and the saturation conversion coefficient determination function generating unit 23 to perform the above-described processes to output the saturation conversion coefficient determination function Fb (the time from the input of the saturation signal SAe to the saturation histogram generating unit 13*b*, up to the output of the saturation conversion coefficient determination function Fb from the saturation conversion coefficient determination function generating unit 23), and outputs the delayed signal to the saturation conversion coefficient determining unit 24, so that, when the saturation conversion coefficient determination function Fb(f) pertaining to a certain frame Fr(f) is input from the saturation conversion coefficient determination function generating unit 23 to the saturation conversion coefficient determining unit 24, the saturation signal SAe(f, x) of each pixel in the same frame is supplied to the saturation conversion coefficient determining unit 24.

The determination of the saturation conversion coefficient by the saturation conversion coefficient determining unit 24 is performed in the same way as the determination of the saturation conversion coefficient by the saturation conversion coefficient determining unit 24 in the second embodiment.

The color difference signal delay units 28*c* and 29*c* delay the color difference signals Cb and Cr output from the color feature quantity calculation unit 31, for a length of time determined by subtracting a time required for the process at the color feature quantity calculation unit 31 (the time from the input of the color signals RIN, GIN, BIN up to the generation of the color difference signals Cb, Cr), from a time required for the processes at the saturation calculation unit 22*c*, the saturation histogram generating unit 13*b*, the saturation conversion coefficient determination function generating unit 23, and the saturation conversion coefficient determining unit 24 (the time from the input of the color signals RIN, GIN, BIN up to the generation of the saturation conversion coefficient Kb), and outputs the delayed signals to the multipliers 26, 27, so that, when the saturation conversion coefficient Kb(f, x) pertaining to a certain pixel Px(x) in a certain frame Fr(f) is supplied from the saturation conversion coefficient determining unit 24 to the multipliers 26 and 27, the color difference signals Cb(f, x) and Cr(f, x) of the same pixel in the same frame are supplied to the multipliers 26 and 27.

The multiplication by the saturation conversion coefficient Kb at the multipliers 26 and 27 is performed in the same way as the multiplication by the saturation conversion coefficient Kb at the multipliers 26 and 27 in the second embodiment. The intensified color difference signals CbM and CrM output from the multipliers 26 and 27 are supplied to the color component value calculation unit 32.

The luminance signal delay unit 30*c* delays the luminance signal Y output from the color feature quantity calculation unit 31, for a length of time determined by subtracting a time required for the process at the color feature quantity calculation unit 31 (the time from the input of the color signals RIN, GIN, BIN up to the output of the color difference signals Cb, Cr), from a time required for the processes at the saturation calculation unit 22c, the saturation histogram generating unit 13b, the saturation conversion coefficient determination function generating unit 23, the saturation conversion coefficient determining unit 24, and the multipliers 26, 27 (the time from the input of the color signals RIN, GIN, BIN up to the output of the saturation conversion coefficient Kb), and outputs the delayed signal to the color component value calculation unit 32, so that, when the color difference signals Cb(f, x) and Cr(f, x) pertaining to a certain pixel Px(x) in a certain frame Fr(f) are supplied from the multipliers 26 and 27 to the color component value calculation unit 32, the luminance signal YIN(f, x) of the same pixel in the same frame is supplied to the color component value calculation unit 32.

The color component value calculation unit 32 converts the luminance signal Y and the color difference signals CbM, CrM into the red, green and blue color component values ROUT, GOUT, BOUT, and outputs the color signals ROUT, GOUT, BOUT representing the color component values ROUT, GOUT, BOUT via the output terminals 20r, 20g, 20b.

The calculation of the red, green and blue color component values ROUT, GOUT, BOUT based on the luminance signal Y and the color difference signals CbM, CrM can be performed in a method commonly used. The process of calculating the red, green and blue color component values from the luminance and the color differences is relatively simple, and can be realized by a circuit of a relatively small size.

Effects of the third embodiment are now explained. Even when the input signal or the output signal comprises red, green and blue color signals, the calculation of the hue or the brightness is unnecessary, as in the second embodiment, so that the size of the circuit, specifically the integrated circuit can be reduced. As a result, the cost can be lowered.

As was described above, in the first embodiment, the color component values ROUT, GOUT, BOUT are calculated using the converted saturation SAb generated by performing the saturation conversion at the saturation conversion unit 15. But calculation of the color component values, or the luminance and the color differences from the saturation, the hue and the brightness requires complicated processes, and hence larged-sized circuits.

In the third embodiment, the color difference signals CbM, CrM are converted using the saturation conversion coefficient Kb, and the color component values ROUT, GOUT, BOUT are calculated using the converted color difference signals CbM, CrM, to realize the conversion of the saturation. That is, the conversion of the saturation is realized without performing the conversion of the signal representing the saturation SAe. As was explained above, the process of calculating the red, green and blue color component values from the luminance and the color differences is relatively simple, and can be realized by a circuit of a relatively small size. Thus, in the third embodiment, neither the conversion of the saturation nor the calculation based on the converted saturation is required for the calculation of the color component values ROUT, GOUT, BOUT, so that the process is relatively simple, and the size of the circuit for performing the process can be reduced.

So far, description has been made of the image processing apparatus according to the present invention, but an image processing method executed by the above-mentioned image processing apparatus also forms part of the present invention.

Each part (part illustrated as a functional block) of the image processing apparatus 10, 10b, 10c in the first, second and third embodiments can be realized by a processing circuit. The processing circuit may be a dedicated hardware, or a CPU executing a program stored in a memory.

For example, the functions of the respective parts in FIG. 1, FIG. 6, or FIG. 10 may be realized by individual processing circuits, or the functions of a plurality of parts may all be realized by a single processing circuit.

When the processing circuit is a CPU, the function of each part of the image processing apparatus can be realized by software, firmware or a combination of firmware and software. The software or the firmware is described as a program, and stored in a memory. The processing circuit reads the program stored in the memory and executes the program, to realize the functions of the respective parts. That is, the image processing apparatus is provided with a memory for storing a program by which, when it is executed by the processing circuit, the functions of the respective parts shown in FIG. 1, FIG. 6, or FIG. 10, are executed. These programs can be said to be those having the computer execute the processes or the procedure in the image processing method implemented by the image processing apparatus.

Furthermore, part of the functions of the respective parts of the image processing apparatus may be realized by dedicated hardware, and the rest may be realized by software or firmware.

Thus, the processing circuit may realize the various functions described above, by hardware, software, firmware, or a combination of them.

Figure 11:
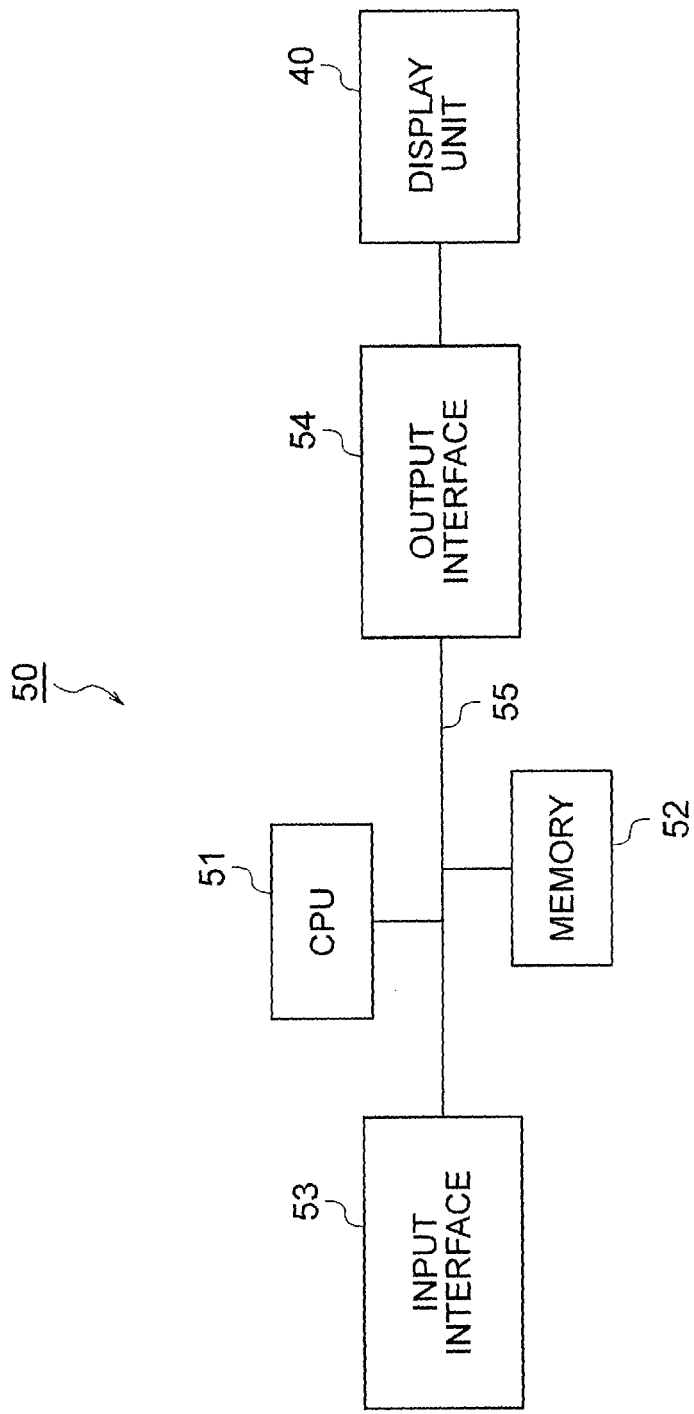
FIG. 11 is a block diagram showing an image processing apparatus formed of an example of a computer for executing the processes of the image processing apparatus of the first, second or third embodiment of the present invention, and a display unit.

FIG. 11 shows an exemplary configuration in which the above-mentioned circuit is a CPU, and a computer (denoted by reference characters 50) including a single CPU realizes all the functions of the image processing apparatus, together with a display unit 40. The computer 50 and the display unit 40 in combination form a video display apparatus.

The computer 50 shown in FIG. 11 includes a CPU 51, a memory 52, an input interface 53, and an output interface 54, which are connected by a bus 55.

Input to the input interface 53 is a video signal of a standard which can be handled by an image display apparatus such as a television set, or a computer. In the case of the first or the third embodiment, the video signal comprises the color signals RIN, GIN, BIN. In the case of the second embodiment, the vide signal comprises the luminance signal YIN, and the color difference signals CbIN, CrIN.

Operating in accordance with the program stored in the memory 52, the CPU 51 performs processes of various parts in the image processing apparatus of the first, second or third embodiment, on the input video signal, supplied via the input interface 53, and supplies the output signal obtained as a result of the processes, via the output interface 54 to the display unit 40.

In the first or third embodiment, the output signal comprises the color signals ROUT, GOUT, BOUT. In the second embodiment, the output signal comprises the luminance signal YOUT, and the color difference signals CbOUT, CrOUT.

The processes performed by the CPU 51 are similar to those described in the first, second or third embodiment. Data generated in the course of the processes is stored in the memory 52.

Effects similar to those described in connection with the image processing apparatus can be obtained from the image processing method implemented by the image processing apparatus, or the program causing a computer to execute the processes of various parts of the image processing apparatus, or the various processes in the image processing method.

REFERENCE CHARACTERS 10, 10b, 10c: image processing apparatus; 12: color feature quantity calculation unit; 13, 13b: saturation histogram generating unit; 14: saturation conversion function generating unit; 15: saturation conversion unit; 16: saturation signal delay unit; 17: hue signal delay unit; 18: brightness signal delay unit; 19: color component value calculation unit; 22: saturation calculation unit; 23: saturation conversion coefficient determination function generating unit; 24: saturation conversion coefficient determining unit; 25: saturation signal delay unit; 26: multiplier; 27: multiplier; 28: color difference signal delay unit; 29: color difference signal delay unit; 30: luminance signal delay unit; 31: color feature quantity calculation unit; 32: color component value calculation unit; 40: display unit; 50: computer; 51 CPU; 52: memory.

What is claimed is:

1. An image processing apparatus comprising:
    a color feature quantity calculation unit for calculating, from an input video signal, saturation, hue, and brightness for each pixel;
    a saturation histogram generating unit for generating a saturation histogram from the saturation;
    a saturation conversion function generating unit for generating a saturation conversion function from the saturation histogram generated by said saturation histogram generating unit;
    a saturation conversion unit for converting the saturation of each pixel by means of the saturation conversion function generated by said saturation conversion function generating unit, and outputting the converted saturation; and
    a color component value calculation unit for calculating red, green and blue color component values, from
the converted saturation output from said saturation conversion unit and the hue and the brightness calculated by said color feature quantity calculation unit, wherein
    said saturation conversion function generating unit generates the saturation conversion function by cumulatively adding, from a low end of the saturation histogram, a frequency of each class of the saturation histogram generated by said saturation histogram generating unit,
    said saturation conversion function generating unit generates the saturation conversion function by adopting a cumulatively added value up to each class, obtained by the cumulative addition of the frequency, as a value of the saturation conversion function corresponding to a representative value of said each class, and
    when the frequency of each class is larger than a predetermined upper limit value, said saturation conversion function generating unit transfers an amount by which the frequency is larger than the upper limit value, from said each class to another class, and performs the calculation of the cumulatively added value using the frequency after the transfer.

2. An image processing apparatus comprising:
    a color feature quantity calculation unit for calculating, from an input video signal, saturation, hue, and brightness for each pixel;
    a saturation histogram generating unit for generating a saturation histogram from the saturation;
    a saturation conversion function generating unit for generating a saturation conversion function from the saturation histogram generated by said saturation histogram generating unit;
    a saturation conversion unit for converting the saturation of each pixel by means of the saturation conversion function generated by said saturation conversion function generating unit, and outputting the converted saturation; and
    a color component value calculation unit for calculating red, green and blue color component values, from
the converted saturation output from said saturation conversion unit and the hue and the brightness calculated by said color feature quantity calculation unit, wherein
    said saturation conversion function generating unit generates the saturation conversion function by cumulatively adding, from a low end of the saturation histogram, a frequency of each class of the saturation histogram generated by said saturation histogram generating unit,
    said saturation conversion function generating unit generates the saturation conversion function by adopting a cumulatively added value up to each class, obtained by the cumulative addition of the frequency, as a value of the saturation conversion function corresponding to a representative value of said each class, and
    when the frequency of each class is smaller than a predetermined lower limit value, said saturation conversion function generating unit transfers an amount by which the frequency is smaller than the lower limit value, from another class to said each class, and performs the calculation of the cumulatively added value using the frequency after the transfer.

3. An image processing apparatus comprising:
    a color feature quantity calculation unit for calculating, from an input video signal, saturation, hue, and brightness for each pixel;
    a saturation histogram generating unit for generating a saturation histogram from the saturation;
    a saturation conversion function generating unit for generating a saturation conversion function from the saturation histogram generated by said saturation histogram generating unit;
    a saturation conversion unit for converting the saturation of each pixel by means of the saturation conversion function generated by said saturation conversion function generating unit, and outputting the converted saturation; and
    a color component value calculation unit for calculating red, green and blue color component values, from
the converted saturation output from said saturation conversion unit and the hue and the brightness calculated by said color feature quantity calculation unit, wherein
    at least one of a maximum value and a minimum value is set in advance for a slope of the saturation conversion function generated by said saturation conversion function generating unit.

4. The image processing apparatus as set forth in claim 1, wherein
said saturation conversion unit outputs a value of the saturation conversion function, corresponding to the saturation of each pixel, as the converted saturation of said each pixel.

5. An image processing apparatus comprising:
a saturation calculation unit for calculating, from an input video signal, saturation for each pixel;
a saturation histogram generating unit for generating a saturation histogram from the saturation;
a saturation conversion coefficient determination function generating unit for generating a saturation conversion coefficient determination function from the saturation histogram generated by said saturation histogram generating unit;
a saturation conversion coefficient determining unit for determining, from the saturation conversion coefficient determination function and the saturation of each pixel represented by the input video signal, a saturation conversion coefficient pertaining to said each pixel; and
multipliers for multiplying color differences of said each pixel represented by the input video signal, by the saturation conversion coefficient pertaining to said each pixel determined by said saturation conversion coefficient determining unit, wherein
said saturation conversion coefficient determination function generating unit generates the saturation conversion coefficient determination function by cumulatively adding, from a low end of the saturation histogram, a frequency of each class of the saturation histogram generated by said saturation histogram generating unit,
said saturation conversion coefficient determination function generating unit generates the saturation conversion coefficient determination function by adopting a cumulatively added value up to each class, obtained by the cumulative addition of the frequency, as a value of the saturation conversion coefficient determination function corresponding to a representative value of said each class, and
when the frequency of each class is larger than a predetermined upper limit value, said saturation conversion coefficient determination function generating unit transfers an amount by which the frequency is larger than the upper limit value, from said each class to another class, and performs the calculation of the cumulatively added value using the frequency after the transfer.

6. An image processing apparatus comprising:
a saturation calculation unit for calculating, from an input video signal, saturation for each pixel;
a saturation histogram generating unit for generating a saturation histogram from the saturation;
a saturation conversion coefficient determination function generating unit for generating a saturation conversion coefficient determination function from the saturation histogram generated by said saturation histogram generating unit;
a saturation conversion coefficient determining unit for determining, from the saturation conversion coefficient determination function and the saturation of each pixel represented by the input video signal, a saturation conversion coefficient pertaining to said each pixel; and
multipliers for multiplying color differences of said each pixel represented by the input video signal, by the saturation conversion coefficient pertaining to said each pixel determined by said saturation conversion coefficient determining unit, wherein
said saturation conversion coefficient determination function generating unit generates the saturation conversion coefficient determination function by cumulatively adding, from a low end of the saturation histogram, a frequency of each class of the saturation histogram generated by said saturation histogram generating unit,
said saturation conversion coefficient determination function generating unit generates the saturation conversion coefficient determination function by adopting a cumulatively added value up to each class, obtained by the cumulative addition of the frequency, as a value of the saturation conversion coefficient determination function corresponding to a representative value of said each class, and
when the frequency of each class is smaller than a predetermined lower limit value, said saturation conversion coefficient determination function generating unit transfers an amount by which the frequency is smaller than the lower limit value, from another class to said each class, and performs the calculation of the cumulatively added value using the frequency after the transfer.

7. An image processing apparatus comprising:
a saturation calculation unit for calculating, from an input video signal, saturation for each pixel;
a saturation histogram generating unit for generating a saturation histogram from the saturation;
a saturation conversion coefficient determination function generating unit for generating a saturation conversion coefficient determination function from the saturation histogram generated by said saturation histogram generating unit;
a saturation conversion coefficient determining unit for determining, from the saturation conversion coefficient determination function and the saturation of each pixel represented by the input video signal, a saturation conversion coefficient pertaining to said each pixel; and
multipliers for multiplying color differences of said each pixel represented by the input video signal, by the saturation conversion coefficient pertaining to said each pixel determined by said saturation conversion coefficient determining unit, wherein
at least one of a maximum value and a minimum value is set in advance for a slope of the saturation conversion coefficient determination function generated by said saturation conversion coefficient determination function generating unit.

8. The image processing apparatus as set forth in claim 5, wherein
said saturation conversion coefficient determining unit determines a ratio of a value of the saturation conversion coefficient determination function corresponding to the saturation of each pixel, to the saturation, as the saturation conversion coefficient pertaining to said each pixel.

9. The image processing apparatus as set forth in claim 5, wherein
the input video signal comprises a luminance signal and color difference signals,
said saturation calculation unit calculates the saturation from the luminance signal and the color difference signals, and
said multipliers multiply the color differences represented by the color difference signals included in the input video signal, by the saturation conversion coefficient.

10. The image processing apparatus as set forth in claim 5, wherein
the input video signal comprises red, green and blue color signals,
said saturation calculation unit calculates the saturation from the red, green and blue color signals,
said image processing apparatus further comprises a color feature quantity calculation unit for calculating luminance and color differences from the red, green and blue color signals,
said multipliers multiply the color differences calculated by the color feature quantity calculation unit, by the saturation conversion coefficient, and
said image processing apparatus further comprises a color component value calculation unit for calculating, from the luminance calculated by said color feature quantity calculation unit, and the color differences obtained by multiplication at said multipliers, red, green and blue color component values.

11. An image processing method comprising:
a color feature quantity calculation step for calculating, from an input video signal, saturation, hue, and brightness for each pixel;
a saturation histogram generating step for generating a saturation histogram from the saturation;
a saturation conversion function generating step for generating a saturation conversion function from the saturation histogram generated by said saturation histogram generating step;
a saturation conversion step for converting the saturation of each pixel by means of the saturation conversion function generated by said saturation conversion function generating step, and outputting the converted saturation; and
a color component value calculation step for calculating red, green and blue color component values, from the converted saturation output from said saturation conversion step and the hue and the brightness calculated by said color feature quantity calculation step, wherein
said saturation conversion function generating step generates the saturation conversion function by cumulatively adding, from a low end of the saturation histogram, a frequency of each class of the saturation histogram generated by said saturation histogram generating step,
said saturation conversion function generating step generates the saturation conversion function by adopting a cumulatively added value up to each class, obtained by the cumulative addition of the frequency, as a value of the saturation conversion function corresponding to a representative value of said each class, and
when the frequency of each class is larger than a predetermined upper limit value, said saturation conversion function generating step transfers an amount by which the frequency is larger than the upper limit value, from said each class to another class, and performs the calculation of the cumulatively added value using the frequency after the transfer.

12. An image processing method comprising:
a saturation calculation step for calculating, from an input video signal, saturation for each pixel;
a saturation histogram generating step for generating a saturation histogram from the saturation;
a saturation conversion coefficient determination function generating step for generating a saturation conversion coefficient determination function from the saturation histogram generated by said saturation histogram generating step;
a saturation conversion coefficient determining step for determining, from the saturation conversion coefficient determination function and the saturation of each pixel represented by the input video signal, a saturation conversion coefficient pertaining to said each pixel; and
a multiplication step for multiplying color differences of said each pixel represented by the input video signal, by the saturation conversion coefficient pertaining to said each pixel determined by said saturation conversion coefficient determining step, wherein
said saturation conversion coefficient determination function generating step generates the saturation conversion coefficient determination function by cumulatively adding, from a low end of the saturation histogram, a frequency of each class of the saturation histogram generated by said saturation histogram generating step,
said saturation conversion coefficient determination function generating step generates the saturation conversion coefficient determination function by adopting a cumulatively added value up to each class, obtained by the cumulative addition of the frequency, as a value of the saturation conversion coefficient determination function corresponding to a representative value of said each class, and
when the frequency of each class is larger than a predetermined upper limit value, said saturation conversion coefficient determination function generating step transfers an amount by which the frequency is larger than the upper limit value, from said each class to another class, and performs the calculation of the cumulatively added value using the frequency after the transfer.

13. A computer readable recording medium storing a program for causing a computer to execute processes of steps in the image processing method as set forth in claim 11.

14. A computer readable recording medium storing a program for causing a computer to execute processes of steps in the image processing method as set forth in claim 12.

15. The image processing apparatus as set forth in claim 2, wherein
said saturation conversion unit outputs a value of the saturation conversion function, corresponding to the saturation of each pixel, as the converted saturation of said each pixel.

16. The image processing apparatus as set forth in claim 2, wherein
said saturation conversion unit outputs a value of the saturation conversion function, corresponding to the saturation of each pixel, as the converted saturation of said each pixel.

17. The image processing apparatus as set forth in claim 6, wherein
said saturation conversion coefficient determining unit determines a ratio of a value of the saturation conversion coefficient determination function corresponding to the saturation of each pixel, to the saturation, as the saturation conversion coefficient pertaining to said each pixel.

18. The image processing apparatus as set forth in claim 7, wherein
said saturation conversion coefficient determining unit determines a ratio of a value of the saturation conversion coefficient determination function corresponding to the saturation of each pixel, to the saturation, as the saturation conversion coefficient pertaining to said each pixel.

19. The image processing apparatus as set forth in claim 6, wherein the input video signal comprises a luminance signal and color difference signals, said saturation calculation unit calculates the saturation from the luminance signal and the color difference signals, and said multipliers multiply the color differences represented by the color difference signals included in the input video signal, by the saturation conversion coefficient.

20. The image processing apparatus as set forth in claim 7, wherein the input video signal comprises a luminance signal and color difference signals, said saturation calculation unit calculates the saturation from the luminance signal and the color difference signals, and said multipliers multiply the color differences represented by the color difference signals included in the input video signal, by the saturation conversion coefficient.

* * * * *